(12) United States Patent
Hashimoto

(10) Patent No.: US 9,539,680 B2
(45) Date of Patent: Jan. 10, 2017

(54) AUXILIARY MEMBER FOR ASSEMBLY/DISASSEMBLY OF GAS TURBINE CASING, GAS TURBINE HAVING THE SAME, ASSEMBLY METHOD OF GAS TURBINE CASING, AND DISASSEMBLY METHOD OF GAS TURBINE CASING

(71) Applicant: MITSUBISHI HEAVY INDUSTRIES, LTD., Tokyo (JP)

(72) Inventor: Shinya Hashimoto, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 1108 days.

(21) Appl. No.: 13/663,576

(22) Filed: Oct. 30, 2012

(65) Prior Publication Data
US 2013/0230392 A1   Sep. 5, 2013

(30) Foreign Application Priority Data
Mar. 2, 2012   (JP) ................ 2012-047222

(51) Int. Cl.
*F01D 25/26* (2006.01)
*B23P 21/00* (2006.01)
(Continued)

(52) U.S. Cl.
CPC .............. *B23P 21/00* (2013.01); *F01D 25/243* (2013.01); *F01D 25/265* (2013.01); *F01D 25/28* (2013.01); *Y10T 29/49229* (2015.01); *Y10T 29/53* (2015.01)

(58) Field of Classification Search
CPC ...... F01D 25/243; F01D 25/265; F01D 25/28; F01D 25/285; B23P 21/00; B23P 15/008; Y10T 29/53; Y10T 29/49229; Y10T 29/49318; Y10T 29/49815; Y10T 29/49822; F05D 2230/64; F05D 2230/644; F05D 2230/68
See application file for complete search history.

(56) References Cited

U.S. PATENT DOCUMENTS

| | | | | |
|---|---|---|---|---|
| 1,707,870 A | * | 4/1929 | Morton | ................ B25B 27/28<br>29/239 |
| 1,957,699 A | * | 5/1934 | Dahistrand | ........... F01D 25/243<br>220/693 |

(Continued)

FOREIGN PATENT DOCUMENTS

| | | |
|---|---|---|
| CN | 102325980 A | 1/2012 |
| JP | 2005-76633 A | 3/2005 |

(Continued)

OTHER PUBLICATIONS

First Office Action dated Sep. 6, 2015, issued in counterpart Chinese Application No. 2012-80070649.X, with English translation (11 pages).

(Continued)

*Primary Examiner* — Ninh H Nguyen
*Assistant Examiner* — Wayne A Lambert
(74) *Attorney, Agent, or Firm* — Westerman, Hattori, Daniels & Adrian, LLP

(57) ABSTRACT

An auxiliary member for assembly/disassembly includes a fixing portion which is fixed to one half casing of a lower half casing and an upper half casing, and a jack receiving portion which extends from the fixing portion and faces an outer surface of the other half casing. When an interval between both end portions in the radial direction of the upper half casing is widened due to heat deformation, the fixing portion of the auxiliary member for assembly/disassembly is fixed to the lower half casing, a jack is disposed between the jack receiving portion of the auxiliary member for assembly/disassembly and the outer surface of the upper half casing, (Continued)

and the interval between both end portions of the jack is widened.

13 Claims, 11 Drawing Sheets

(51) Int. Cl.
*F01D 25/28* (2006.01)
*F01D 25/24* (2006.01)

(56) References Cited

U.S. PATENT DOCUMENTS

| | | | | | |
|---|---|---|---|---|---|
| 2,393,795 | A | * | 1/1946 | Miller | B25B 27/16 254/100 |
| 3,107,419 | A | * | 10/1963 | Sandlfer | B25B 27/16 29/239 |
| 3,628,884 | A | * | 12/1971 | Mierley, Sr. | F01D 25/26 29/464 |
| 3,741,680 | A | * | 6/1973 | Killmann | F01D 25/265 285/913 |
| 3,764,226 | A | * | 10/1973 | Matto | F01D 25/265 285/913 |
| 3,869,784 | A | * | 3/1975 | Simpson | B23K 37/0533 228/49.4 |
| 4,015,324 | A | * | 4/1977 | Lutter | B25B 27/16 254/100 |
| 4,513,955 | A | * | 4/1985 | Daubon | B23K 37/0435 269/155 |
| 4,540,199 | A | * | 9/1985 | Neill | B25B 27/16 285/27 |
| 5,129,136 | A | * | 7/1992 | Richardson | B25B 27/16 29/239 |
| 5,228,181 | A | * | 7/1993 | Ingle | B25B 27/16 228/44.5 |
| 5,560,091 | A | * | 10/1996 | Labit, Jr. | B25B 27/16 269/43 |
| 5,605,438 | A | * | 2/1997 | Burdgick | F01D 25/145 415/182.1 |
| 6,267,556 | B1 | | 7/2001 | Kikuchi et al. | |
| 6,298,534 | B1 | * | 10/2001 | Sajota | B25B 27/00 29/256 |
| 6,352,404 | B1 | | 3/2002 | Czachur et al. | |
| 6,983,525 | B2 | * | 1/2006 | Moreno | B23Q 3/186 228/49.1 |
| 8,602,390 | B2 | * | 12/2013 | Herbold | F16B 5/0233 254/100 |
| 9,115,828 | B2 | * | 8/2015 | Nakamura | F16L 23/003 |
| 2003/0180140 | A1 | * | 9/2003 | Reigl | F01D 25/243 415/47 |
| 2005/0044685 | A1 | | 3/2005 | Brooks et al. | |
| 2006/0034678 | A1 | | 2/2006 | Tomoko et al. | |
| 2010/0226770 | A1 | * | 9/2010 | Frick | F01D 25/24 415/214.1 |
| 2012/0039709 | A1 | * | 2/2012 | Rauch | F01D 25/162 415/213.1 |
| 2012/0272496 | A1 | * | 11/2012 | Herbold | F01D 25/285 29/402.03 |

FOREIGN PATENT DOCUMENTS

JP    2006-52733 A    2/2006
JP    2008-064043 A   3/2008

OTHER PUBLICATIONS

Written Opinion dated Jan. 15, 2013, issued is International Application No. PCT/JP2012/078057.
International Search Report of PCT/JP2012/078057, date of mailing Jan. 15, 2013.
English translation of International Search Report of PCT/JP2012/078057, date of mailing date Jan. 15, 2013.
Translation of Written Opinion of the International Searching Authority (PCT/ISA/237) dated Jan. 15, 2013, issued in corresponding Application No. PCT/JP2012/078057. (4 pages).

* cited by examiner

AUXILIARY MEMBER FOR ASSEMBLY/DISASSEMBLY OF GAS TURBINE CASING, GAS TURBINE HAVING THE SAME, ASSEMBLY METHOD OF GAS TURBINE CASING, AND DISASSEMBLY METHOD OF GAS TURBINE CASING

TECHNICAL FIELD

The present invention relates to an auxiliary member for assembly/disassembly of a gas turbine casing in which a first casing member forming a portion in a circumferential direction and a second casing member forming the other portion in the circumferential direction are connected by a fastener, a gas turbine having the same, an assembly method of a gas turbine casing, and a disassembly method of a gas turbine casing.

The present application claims priority on Japanese Patent Application No. 2012-047222, filed Mar. 2, 2012, the content of which is incorporated herein by reference.

BACKGROUND ART

For example, as described in Patent Document 1 below, a gas turbine includes a compressor which compresses outside air and generates compressed air, a plurality of combustors which mix fuel with the compressed air, combust the mixture, and generate combustion gas, and a turbine which is driven by the combustion gas. The compressor includes a compressor rotor which is rotated about a rotational axis and a compressor casing which covers the compressor rotor. The turbine includes a turbine rotor which is connected to the compressor rotor and is rotated about the above-described rotational axis, a turbine casing which covers the turbine rotor, and an exhaust casing through which combustion gas which has driven the turbine rotor passes as exhaust gas.

The compressor casing, the turbine casing, and the exhaust casing are all formed in a tubular shape. The compressor casing, the turbine casing, and the exhaust casing are connected to one another by a bolt and a nut, and configure a tubular gas turbine casing.

Generally, the compressor casing, the turbine casing, and the exhaust casing all include upper half casings which form the upper side of the casing and lower half casings. The upper half casings and the lower half casings are connected to each other by bolts and nuts.

PRIOR ART DOCUMENT

Patent Document

[Patent Document 1] Japanese Unexamined Patent Application, First Publication No. 2008-64043

SUMMARY OF INVENTION

Problem to be Solved by the Invention

When a gas turbine is repaired and inspected, a gas turbine casing is required to be disassembled. The gas turbine casing is deformed due to its own weight or is subjected to secular deformation due to heat. Therefore, disassembly of the gas turbine casing or assembly after the disassembly may be difficult.

An object of the present invention is to provide an auxiliary member for assembly/disassembly of a gas turbine casing capable of easily performing disassembly or assembly even if the gas turbine casing is deformed due to own weight or heat, a gas turbine having the same, and an assembly method and disassembly method of a gas turbine casing.

Means for Solving the Problem

According to an auxiliary member for assembly/disassembly of a gas turbine casing related to a first aspect of the present invention, there is provided an auxiliary member for assembly/disassembly of a gas turbine casing which covers an outer circumference of a rotor which rotates about a rotational axis and in which a first casing member forming a portion in a circumferential direction of the gas turbine casing and a second casing member forming the other portion in the circumferential direction of the gas turbine casing are connected by a fastener, including: a fixing portion which is fixed to one of the first and second casing members; and a jack receiving portion which extends from the fixing portion and faces an outer surface of the other of the first and second casing members.

First, a usage form of the auxiliary member for assembly/disassembly at the time of disassembly of the gas turbine casing will be described.

Here, in the gas turbine casing, a center side casing which forms a portion in the axial direction in which the rotational axis of the rotor extends and an end side casing which forms an end side in the axial direction with respect to the center side casing are connected by a first fastener. In the center side casing, a center side first casing member forming a portion in the circumferential direction and a center side second casing member forming the other portion in the circumferential direction are connected by a second fastener. In the end side casing, an end side first casing member and an end side second casing member are connected by a third fastener. The end side first casing member which forms a portion in the circumferential direction, is adjacent in the axial direction to the center side first casing member, and is connected by the first fastener. The end side second casing member which forms the other portion in the circumferential direction, is adjacent in the axial direction to the center side second casing member, and is connected by the first fastener.

First, the fixing portion of the first auxiliary member for assembly/disassembly of the auxiliary members tier assembly/disassembly is fixed to the end side first casing member. Moreover, the fixing portion of the second auxiliary member for assembly/disassembly is fixed to the end side second casing member so that the fixing portion faces the jack receiving portion of the first auxiliary member for assembly/disassembly with an interval in an axial direction therebetween.

Next, the second fastener which connects the center side first casing member and the center side second casing member is removed. The third fastener which connects the end side first casing member and the end side second casing member is removed. The first fastener which connects the center side second casing member and the end side second casing member is removed.

Next, the jack is disposed between the jack receiving portion of the first auxiliary member for assembly/disassembly and the fixing portion of the second auxiliary member for assembly/disassembly, or between the fixing portion of the first auxiliary member for assembly/disassembly and the jack receiving portion of the second auxiliary member for assembly/disassembly.

Subsequently, the interval between both end portions of the jack is widened, and thus, the end side second casing member is separated from the center side second casing member in the axial direction. Moreover, the center side second casing member is separated from the center side first casing member in the state where the end side second casing member is separated in the axial direction.

As described above, when the center side second casing member is separated from the center side first casing member, the end side second casing member has been separated from the center side second casing member in the axial direction. Thereby, the center side second casing member can be easily removed from the center side first casing member.

Next, a usage form of the auxiliary member for assembly/disassembly at the time of assembly of the gas turbine casing will be described.

Here, the gas turbine casing is configured so that a first casing member forming a portion in a circumferential direction and a second casing member forming the other portion in the circumferential direction are connected by a fastener.

First, the fixing portion of the auxiliary member for assembly/disassembly is fixed to one casing member of the first casing member and the second casing member, in which the interval in the radial direction between both end portions in the circumferential direction is narrowed due to deformation caused by heat.

Next, the second casing member is disposed so as to face the first casing member.

Next, the jack is disposed between the jack receiving portion of the auxiliary member for assembly/disassembly which is fixed to the one of the first and second casing members, in which an interval in the radial direction between both end portions in the circumferential direction is narrowed, and the outer surface of the other of the first and second casing members in which the interval in the radial direction between both end portions in the circumferential direction is widened.

Subsequently, the interval between both end portions of the jack is widened, and the interval in the radial direction between both end portions in the circumferential direction of the other of the first and second casing members is narrowed. Moreover, both end portions in the circumferential direction of the other of the first and second casing members are made to face both end portions in the circumferential direction of one of the first and second casing members.

In addition, the one of the first and second casing members and the other of the first and second casing members, in which both end portions face each other, are connected by the fastener.

As described above, even when both end portions in the circumferential direction of the first casing member and both end portions in the circumferential direction of the second casing member do not face each other due to secular deformation caused by heat, it is possible to forcibly make both end portions in the circumferential direction of the first casing member and both end portions in the circumferential direction of the second casing member face each other. Therefore, the first casing member and the second casing member can be easily connected.

Here, in the auxiliary member for assembly/disassembly of a gas turbine casing, the first casing member and the second casing member may include flange portions which face each other and are connected by the fastener respectively, and the fixing portion may be fixed to the flange portion of the one of the first and second casing members, and the jack receiving portion may face the flange portion of the other of the first and second casing members.

The flange portion of the first casing member and the flange portion of the second casing member may contact each other. Thereby, in the auxiliary member for assembly/disassembly, even if the auxiliary member is disposed across the both casing members, an increase in the size can be avoided. Since the flange portion has relatively high stiffness in the casing, even if the flange portion receives force from the jack, deformation due to the force can be a minimized.

In the auxiliary member for assembly/disassembly of a gas turbine casing, a radial receiving surface, which faces the outer surface of the other of the first and second casing members with an interval therebetween and is perpendicular to the radial direction with respect to the rotational axis, may be formed on the jack receiving portion.

First, the auxiliary member for assembly/disassembly is fixed to the one casing member of the first casing member and the second casing member. Next, the jack is disposed between the auxiliary member for assembly/disassembly and the outer surface of the other of the first and second casing members. Moreover, the interval between both end portions of the jack is widened, and the interval in the radial direction between both end portions in the circumferential direction of the other of the first and second casing members is narrowed. At this time, in the auxiliary member for assembly/disassembly, since the radial receiving surface perpendicular to the direction in which the interval between both end portions of the jack is widened receives the force which is generated by the jack, the jack can be stably supported.

In the auxiliary member for assembly/disassembly of the gas turbine casing, an axial receiving surface, which face toward one side in an axial direction in which the rotational axis extends and is perpendicular to the axial direction, may be formed on the jack receiving portion and the fixing portion.

First, the fixing portion of the first auxiliary member for assembly/disassembly of a plurality of the auxiliary members for assembly/disassembly is fixed to the end side first casing member, and the fixing portion of the second auxiliary member for assembly/disassembly is fixed to the end side second casing member so that the fixing portion faces the jack receiving portion of the first auxiliary member for assembly/disassembly with an interval in an axial direction therebetween. Next, the jack is disposed between the jack receiving portion of the first auxiliary member for assembly/disassembly and the fixing portion of the second auxiliary member for assembly/disassembly, or between the fixing portion of the first auxiliary member for assembly/disassembly and the jack receiving portion of the second auxiliary member for assembly/disassembly.

In addition, the interval between both end portions of the jack is widened, and thus, the end side second casing member is separated from the center side second casing member in the axial direction. At this time, in the auxiliary member for assembly/disassembly, since the axial receiving surface perpendicular to the direction in which both end portions of the jack are widened receives the force which is generated by the jack, the jack can be stably supported.

According to a second aspect of the present invention, there is provided an auxiliary member set for assembly/disassembly of a gas turbine casing, including: a plurality of the auxiliary members for assembly/disassembly of a gas turbine casing, wherein a portion of the plurality of the auxiliary members for assembly/disassembly forms first radial auxiliary members which include the fixing portion fixed to the first casing member, and the other portion of the plurality of the auxiliary members for assembly/disassembly forms second radial auxiliary members which include the fixing portion fixed to the second casing member.

In the auxiliary member set for assembly/disassembly, when the interval in the radial direction between both end portions in the circumferential direction of the first casing member is widened due to heat influence, the second radial auxiliary member is fixed to the second casing member, and the jack is disposed between the second radial auxiliary member and the outer surface of the first casing member. Moreover, the interval between both end portions of the jack is widened, and the interval in the radial direction between both end portions in the circumferential direction of the first casing member is narrowed.

In the auxiliary member set for assembly/disassembly, when the interval in the radial direction between both end portions in the circumferential direction of the second casing member is widened due to heat influence, the first radial auxiliary member is fixed to the first easing member, and the jack is disposed between the first radial auxiliary member and the outer surface of the second casing member. In addition, the interval between both end portions of the jack is widened, and the interval in the radial direction between both end portions in the circumferential direction of the second casing member is narrowed.

Thereby, the auxiliary member set for assembly/disassembly can be applied to the case where the interval in the radial direction between both end portions in the circumferential direction of the first casing member is widened due to heat influence, or to the case where the interval in the radial direction between both end portions in the circumferential direction of the second casing member is widened due to heat influence.

In the auxiliary member set for assembly/disassembly, when the center side second casing member is removed from the center side first casing member, first, the fixing portion of the first radial auxiliary member is fixed to the end side first casing member. Thereafter, the fixing portion of the second radial auxiliary member is fixed to the end side second casing member so that the fixing portion faces the jack receiving portion of the first radial auxiliary member with an interval in the axial direction therebetween. Next, the jack is disposed between the jack receiving portion of the first radial auxiliary member and the fixing portion of the second radial auxiliary member, or between the fixing portion of the first radial auxiliary member and the jack receiving portion of the second radial auxiliary member. Subsequently, the interval between both end portions of the jack is widened, and thus, the end side second casing member is separated from the center side second casing member in the axial direction. Moreover, the center side second casing member is separated from the center side first casing member in the state where the end side second casing member is separated in the axial direction.

Thereby, in the auxiliary member set for assembly/disassembly, the center side second casing member can be separated from the center side first casing member in the state where the end side second casing member is separated from the center side second casing member in the axial direction.

The auxiliary member set for assembly/disassembly of a gas turbine casing may include a pair of the first radial auxiliary members and a pair of the second radial auxiliary members, one of the first radial auxiliary members may include the fixing portion which is fixed to one end in the circumferential direction of the first casing member, the other of the first radial auxiliary members may include the fixing portion which is fixed to the other end in the circumferential direction of the first casing member, one of the second radial auxiliary members may include the fixing portion which is fixed to one end in the circumferential direction of the second casing member, and the other of the second radial auxiliary members may include the fixing portion which is fixed to the other end in the circumferential direction of the second casing member.

In the auxiliary member set for assembly/disassembly, when the interval in the radial direction between both end portions in the circumferential direction of the first casing member is widened due to heat influence, one of the second radial auxiliary members is fixed to one end in the circumferential direction of the second casing member, and the other of the second radial auxiliary members is fixed to the other end in the circumferential direction of the second casing member. Next, the jack is disposed between one of the second radial auxiliary members and the outer surface of the first casing member, and the jack is disposed between the other of the second radial auxiliary members and the outer surface of the first casing member. Moreover, the interval between both end portions of both jacks is widened, and the interval in the radial direction between both end portions in the circumferential direction of the first casing member is narrowed.

In the auxiliary member set for assembly/disassembly, when the interval in the radial direction between both end portions in the circumferential direction of the second casing member is widened due to heat influence, one of the first radial auxiliary members is fixed to one end in the circumferential direction of the first casing member, and the other of the first radial auxiliary members is fixed to the other end in the circumferential direction of the first casing member. Next, the jack is disposed between one of the first radial auxiliary members and the outer surface of the second casing member, and the jack is disposed between the other of the first radial auxiliary members and the outer surface of the second casing member. In addition, the interval between both end portions of both jacks is widened, and the interval in the radial direction between both end portions in the circumferential direction of the second casing member is narrowed.

In the auxiliary member set for assembly/disassembly, when the center side second casing member is removed from the center side first casing member, first, the fixing portion of one of the first radial auxiliary members is fixed to one end portion in the circumferential direction of the end side first casing member. Thereafter, the fixing portion of one of the second auxiliary members is fixed to one end portion in the circumferential direction of the end side second casing member so that the fixing portion faces the jack receiving portion of the first radial auxiliary member with an interval in the axial direction therebetween. In addition, the fixing portion of the other of the first radial auxiliary members is fixed to the other end portion in the circumferential direction of the end side first casing member. Thereafter, the fixing portion of the other of the second radial auxiliary members is fixed to the other end in the circumferential direction of the end side second casing member so that the fixing portion faces the jack receiving portion of the first radial auxiliary member with an interval in the axial direction therebetween. Next, the jack is disposed between the jack receiving portion of one of the first radial auxiliary members and the fixing portion of the one of the second radial auxiliary members, or between the fixing portion of one of the first radial auxiliary members and the jack receiving portion of one of the second radial auxiliary members. Moreover, the jack is disposed between the jack receiving portion of the other of the first radial auxiliary members and the fixing portion of the other of the second radial auxiliary members, or between the fixing portion of the other of the first radial auxiliary members and the jack receiving portion of the other of the second radial auxiliary members. Subsequently, the interval between both end portions of each jack is widened, and thus, the end side second casing member is separated from the center side second casing member in the axial direction. Moreover, the center side second casing member is separated from the center side first casing member in the state where the end side second casing member is separated in the axial direction.

According to a third aspect of the present invention, there is provided an auxiliary member set for assembly/disassembly of a gas turbine casing, including: at least a pair of the auxiliary members for assembly/disassembly of a gas turbine casing, wherein a pair of the auxiliary members for assembly/disassembly may form radial auxiliary members respectively, one of the radial auxiliary members may include the fixing portion which is fixed to one end portion in the circumferential direction of one of the first and second easing members, and the other of the radial auxiliary members may include the fixing portion which is fixed to the other end portion in the circumferential direction of one of the first and second casing members.

In the auxiliary member set for assembly/disassembly, when the interval in the radial direction between both end portions in the circumferential direction of the other of the first and second casing members of the first casing member and the second casing member is widened due to heat influence, one of the radial auxiliary members is fixed to one end portion in the circumferential direction of one of the first and second casing members. Next, the other of the radial auxiliary members is fixed to the other end portion in the circumferential direction of one of the first and second casing members. Moreover, the interval between both end portions of both jacks is widened, and the interval in the radial direction between both end portions in the circumferential direction of the other of the first and second casing members is narrowed.

According to a fourth aspect of the present invention, there is provided an auxiliary member set for assembly/disassembly of a gas turbine casing, including: a plurality of the auxiliary members for assembly/disassembly of a gas turbine casing, wherein the plurality of the auxiliary members for assembly/disassembly may form axial auxiliary members, a portion of the axial auxiliary members, as first axial auxiliary members, may include a fixing portion which is fixed to the first casing member, the other portion of the axial auxiliary members, as second axial auxiliary members, may form a group with any of the first axial auxiliary members and may include the fixing portion which is fixed to the second casing member with an interval in an axial direction, in which the rotational axis extends, to the first axial auxiliary member which forms the group, and axial receiving surfaces which face each other with an interval therebetween in the axial direction may be formed on the jack receiving portion of the first axial auxiliary member, and the fixing portion of the second axial auxiliary member which form the group with the first axial auxiliary members.

In the auxiliary member set for assembly/disassembly, when the center side second casing member is removed from the center side first casing member, first, the fixing portion of the first axial auxiliary member is fixed to the end side first casing member. Thereafter, the fixing portion of the second axial auxiliary member is fixed to the end side second casing member so that the fixing portion faces the jack receiving portion of the first axial auxiliary member with an interval in the axial direction therebetween. Next, the jack is disposed between the jack receiving portion of the first axial auxiliary member and the fixing portion of the second axial auxiliary member, or between the fixing portion of the first axial auxiliary member and the jack receiving portion of the second axial auxiliary member. Subsequently, the interval between both end portions of the jack is widened, and thus, the end side second casing member is separated from the center side second casing member in the axial direction. Moreover, the center side second casing member is separated from the center side first casing member in the state where the end side second casing member is separated in the axial direction.

Thereby, in the auxiliary member set for assembly/disassembly, the center side second casing member can be separated from the center side first casing member in the state where the end side second casing member is separated from the center side second casing member in the axial direction.

The auxiliary member set for assembly/disassembly of a gas turbine casing may include a pair of the first axial auxiliary members, and a pair of the second axial auxiliary members which forms a group with the pair of the first axial auxiliary members, one of the pair of the first axial auxiliary members may include the fixing portion which is fixed to one end in the circumferential direction of the first casing member, the other of the first axial auxiliary members may include the fixing portion which is fixed to the other end in the circumferential direction of the first casing member, one of the pair of the second axial auxiliary members may include the fixing portion which is fixed to one end in the circumferential direction of the second easing member with an interval in the axial direction to one of the first axial auxiliary members, and the other of the second axial auxiliary members may include the fixing portion which is fixed to the other end in the circumferential direction of the second casing member with an interval in the axial direction to the other of the first axial auxiliary members.

In the auxiliary member set for assembly/disassembly, when the center side second casing member is removed from the center side first casing member, first, the fixing portion of one of the first axial auxiliary members is fixed to one end portion in the circumferential direction of the end side first casing member. Thereafter, the fixing portion of one of the second axial auxiliary members is fixed to the end portion in the circumferential direction of the end side second casing member so that the fixing portion faces the jack receiving portion of the first axial auxiliary member with an interval in the axial direction therebetween. In addition, the fixing portion of the other of the first axial auxiliary members is fixed to the other end portion in the circumferential direction of the end side first casing member. Thereafter, the fixing portion of the other of the second axial auxiliary members is fixed to the other end portion in the circumferential direction of the end side second casing member so that the fixing portion faces the jack receiving portion of the first axial auxiliary member with an interval in the axial direction therebetween. Next, the jack is disposed between the jack receiving portion of one of the first axial auxiliary members and the fixing portion of one of the second axial auxiliary members, or between the fixing portion of one of the first axial auxiliary members and the jack receiving portion of one of the second axial auxiliary members. Moreover, the jack is disposed between the jack receiving portion of the other of the first axial auxiliary members and the fixing portion of the other of the second axial auxiliary members, or between the fixing portion of the other of the first axial auxiliary members and the jack receiving portion of the other of the second axial auxiliary members. Subsequently, the interval between both end portions of each jack is widened, and thus, the end side second casing member is separated from the center side second casing member in the axial direction. Moreover, the center side second casing member is separated from the center side first casing member in the state where the end side second casing member is separated in the axial direction.

According to a fourth aspect of the present invention, there is provided a gas turbine including: the auxiliary member for assembly/disassembly of a gas turbine casing; and the gas turbine casing which includes the first casing member and the second casing member.

According to a fifth aspect of the present invention, there is provided a gas turbine including: the auxiliary member set for assembly/disassembly of a gas turbine casing; and a gas turbine casing which includes the first casing member and the second casing member.

According to a sixth aspect of the present invention, there is provided an assembly method of a gas turbine casing which covers an outer circumference of a rotor which rotates about a rotational axis and in which a first casing member forming a portion in a circumferential direction and a second casing member forming the other portion in the circumferential direction are connected by a fastener, including: an auxiliary member preparation step of preparing an auxiliary member for assembly/disassembly in which a fixing portion which is fixed to one casing member of the first casing member and the second casing member and a jack receiving portion which extends from the fixing portion and faces an outer surface of the other of the first and second casing members are formed; an auxiliary member fixation step of fixing the fixing portion of the auxiliary member for assembly/disassembly to one of the first and second casing members, in which an interval in a radial direction between both end portions in a circumferential direction is narrowed; a casing member disposition step of disposing the second casing member so as to face the first casing member; a jack disposition step of disposing a jack between the jack receiving portion of the auxiliary member for assembly/disassembly which is fixed to one of the first and second casing members, in which an interval in the radial direction between both end portions in the circumferential direction is narrowed, and the outer surface of the other of the first and second casing members in which the interval in the radial direction between both end portions in the circumferential direction is widened; a jack operating step of widening the interval between both end portions of the jack, narrowing the interval in the radial direction between both end portions in the circumferential direction of the other of the first and second casing members, and making both end portions in the circumferential direction of the other of the first and second casing members face both end portions in the circumferential direction of one of the first and second casing members; and a casing connection step of connecting one of the first and second casing members and the other of the first and second casing members, in which both end portions face each other, by the fastener.

In the assembly method of a gas turbine casing, the interval in the radial direction between both end portions of the other of the first and second casing members, in which the interval in the radial direction between both end portions in the circumferential direction is wide, is narrowed. Moreover, both end portions in the circumferential direction of the other of the first and second casing members are made to face both end portions in the circumferential direction of one of the first and second casing members. Thereby, in the assembly method, one of the first and second casing members and the other of the first and second casing members can be easily connected by a fastener.

According to a seventh aspect of the present invention, there is provided a disassembly method of a gas turbine casing which covers an outer circumference of a rotor which rotates about a rotational axis and in which a center side casing forming a portion in an axial direction in which the rotational axis extends and an end side casing forming an end side in the axial direction with respect to the center side casing are connected by a first fastener, in which the center side casing is configured so that a center side first casing member forming a portion in the circumferential direction and a center side second casing member forming the other portion in the circumferential direction are connected by a second fastener, and the end side casing is configured so that an end side first casing member forming a portion in the circumferential direction, is adjacent in the axial direction to the center side first casing member, and is connected by the first fastener, and an end side second casing member which forms the other portion in the circumferential direction, is adjacent in the axial direction to the center side second casing member, and is connected by the first fastener ac connected by a third fastener, the method including: an auxiliary member preparation step of preparing a plurality of auxiliary members for assembly/disassembly in which a fixing portion which is fixed to one of the end side first casing member and the end side second casing member and a jack receiving portion which extends from the fixing portion and faces an outer surface of the other of the end side first casing member and the end side second casing member are formed; an auxiliary member fixation step of fixing the fixing portion of a first auxiliary member for assembly/disassembly of the plurality of the auxiliary members for assembly/disassembly to the end side first easing member, and fixing the fixing portion of a second auxiliary member for assembly/disassembly to the end side second casing member so that the fixing portion faces the jack receiving portion of the first auxiliary member for assembly/disassembly with an interval in the axial direction therebetween; a fastener removing step of removing the second fastener which connects the center side first casing member and the center side second casing member, removing the third fastener which connects the end side first casing member and the end side second casing member, and removing the first fastener which connects the center side second casing member and the end side second casing member; a jack disposition step of disposing the jack between the jack receiving portion of the first auxiliary member for assembly/disassembly and the fixing portion of the second auxiliary member for assembly/disassembly, or between the fixing portion of the first auxiliary member for assembly/disassembly and the jack receiving portion of the second auxiliary member for assembly/disassembly; a jack operating step of widening the interval between both end portions of the jack, and separating the end side second casing member in the axial direction from the center side second casing member; and a center side casing removing step of separating the center side second casing member from the center side first casing member in the state where the end side second casing member is separated in the axial direction.

In the disassembly method of a gas turbine casing, the center side second casing member is separated from the center side first casing member in the state where the end side second casing member is separated from the center side second casing member in the axial direction. Thereby, in the disassembly method, the center side second casing member can be easily separated from the center side first casing member.

Advantageous Effects of Invention

According to the present invention, even if the gas turbine casing is deformed due to its own weight or heat, the disassembly or the assembly of the gas turbine casing can be easily performed.

DESCRIPTION OF EMBODIMENTS

Hereinafter, an embodiment of a gas turbine according to the present invention will be described in detail with reference to FIGS. 1 to 13.

Figure 1:
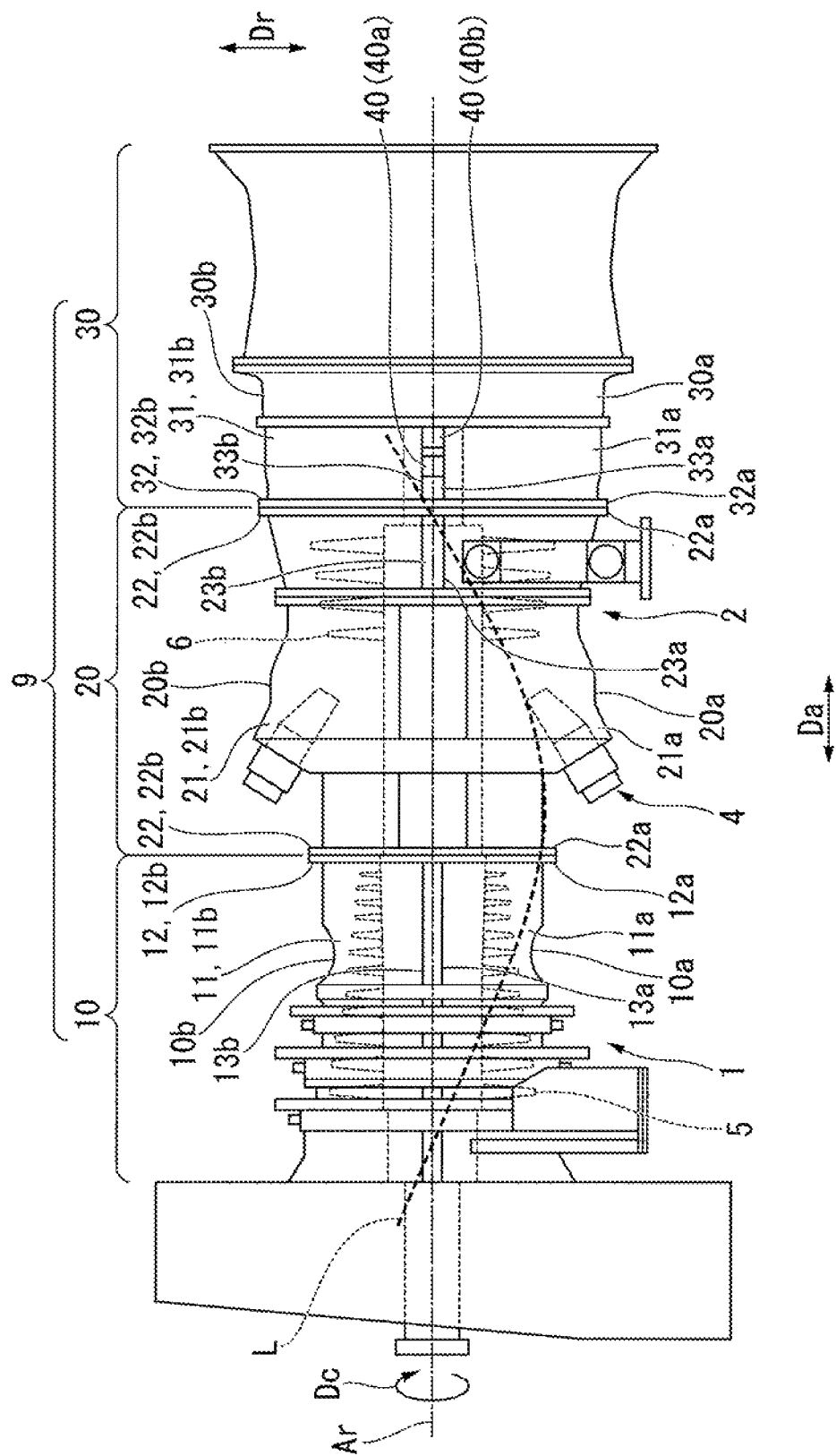
FIG. 1 is a side view of a gas turbine in an embodiment according to the present invention.
Figure 2:
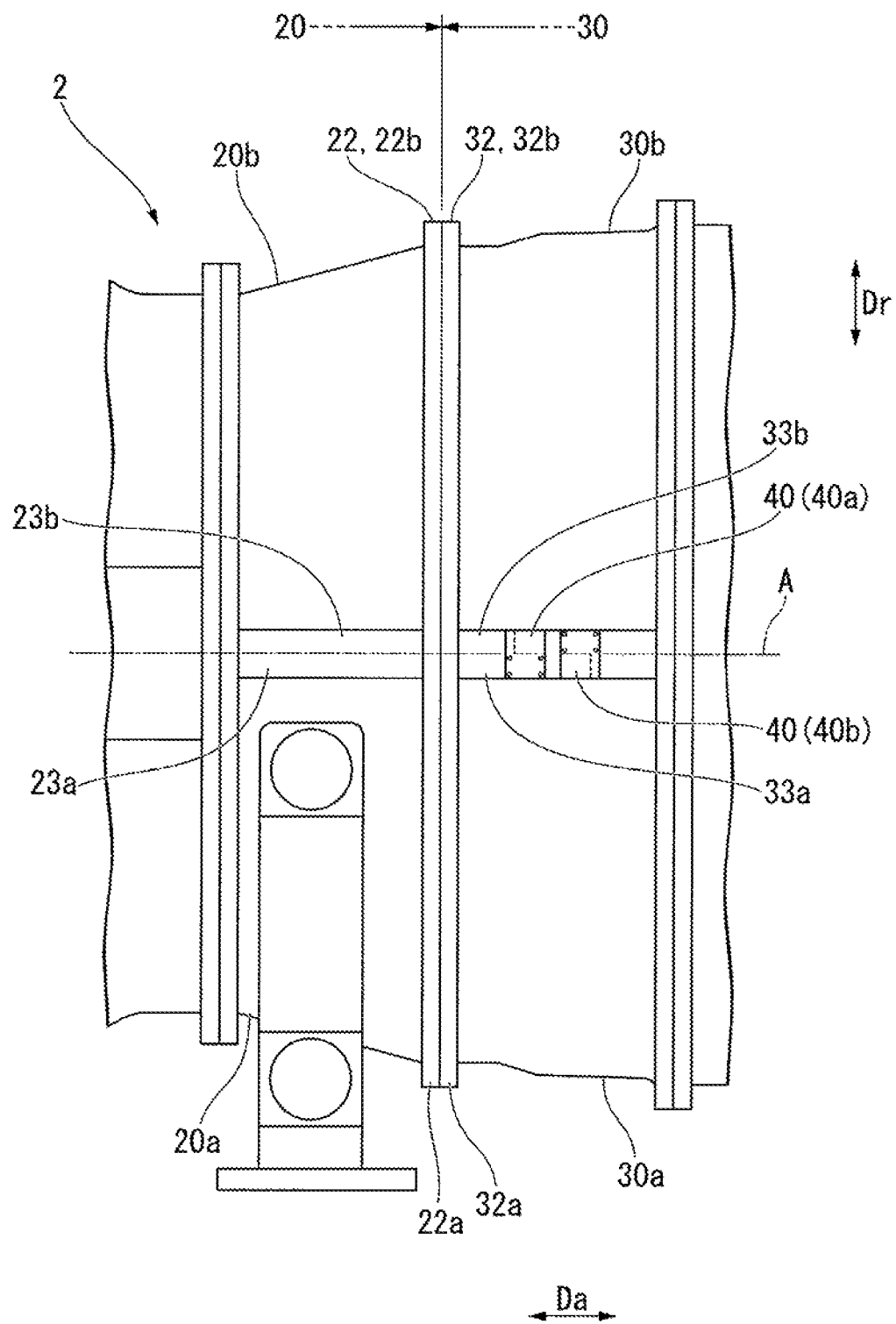
FIG. 2 is a side view of a main portion of the gas turbine in the embodiment according to the present invention.
Figure 3:
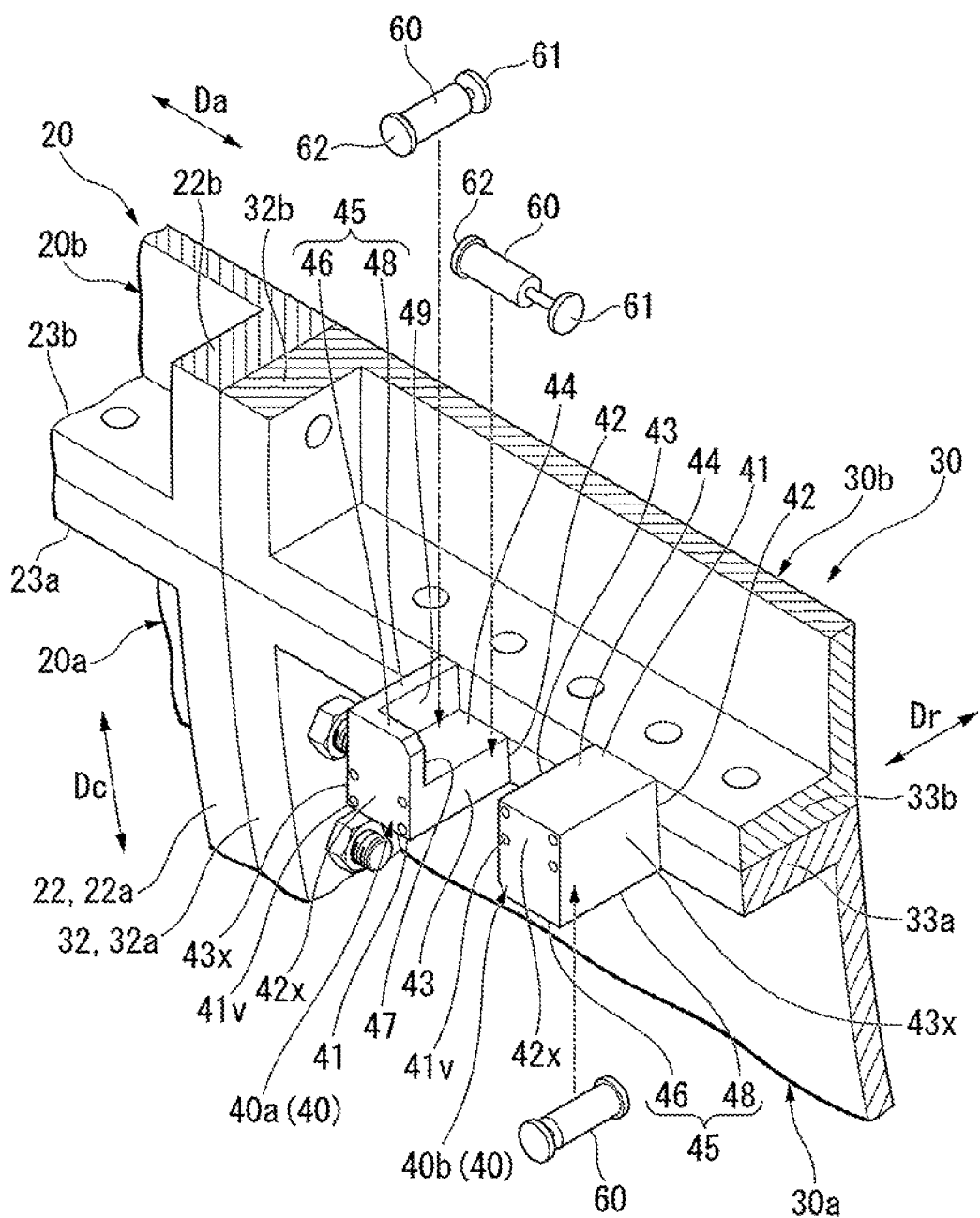
FIG. 3 is a perspective view of an auxiliary member for assembly/disassembly and a gas turbine casing around the auxiliary member in the embodiment according to the present invention.

As shown in FIG. 1, a gas turbine of the present embodiment includes a compressor 1, a plurality of combustors 4, and a turbine 2. The compressor 1 compresses outside air and generates compressed air. The combustor 4 mixes a fuel from a fuel supply source with the compressed air, combusts the mixture, and generates combustion gas. The turbine 2 is driven by the combustion gas.

The compressor 1 includes a compressor rotor 5 and a compressor casing 10. The compressor rotor 5 is rotated about a rotational axis Ar which extends in a horizontal direction. The compressor casing 10 covers the outer circumference of the compressor rotor 5.

The turbine 2 includes a turbine rotor 6, a turbine casing 20, and an exhaust casing 30. The turbine rotor 6 is connected to the compressor rotor 5 and is rotated around the above-described rotational axis Ar. The turbine casing 20 covers the outer circumference of the turbine rotor 6. The combustion gas which drives the turbine rotor 6 passes through the exhaust casing 30 as exhaust gas.

The turbine casing 20 is connected to the downstream side of the compressor casing 10, and the exhaust casing 30 is connected to the downstream side of the turbine casing 20. A plurality of combustors 4 are connected to a portion of the upstream side in the turbine casing 20. The gas turbine casing 9 includes the compressor casing 10, the turbine casing 20, and the exhaust casing 30. Moreover, for the convenience of the following description, the direction in which the rotational axis Ar extends is referred to as an axial direction Da, and the direction around the rotational axis is referred to as a circumferential direction Dc.

The compressor casing 10, the turbine casing 20 (center side casing), and the exhaust casing 30 (end side casing) all include tube portions 11, 21, and 31 which are formed in a tubular shape.

Longitudinal flange portions (axial flange portions) 12, 22, and 32, which protrude toward the outer side in a radial direction Dr having the rotational axis Ar as the center along the entire circumference of each of the tube portions 11, 21, and 31, are formed in a downstream end portion of the tube portion 11 of the compressor casing 10, upstream and downstream end portions of the tube portion 21 of the turbine casing 20, and an upstream end portion of the tube portion 31 of the exhaust casing 30.

The longitudinal flange portion 12 of the downstream end portion of the compressor casing 10 is connected to the longitudinal flange portion 22 of the upstream side end portion of the turbine casing 20 through a bolt and a nut which are used as a fastener.

The longitudinal flange portion 22 of the downstream side end portion of the turbine casing 20 is connected to the longitudinal flange portion 32 of the upstream side end portion of the exhaust casing 30 through a bolt and a nut (first fastener) which are used as a fastener.

The compressor casing 10, the turbine casing 20, and the exhaust casing 30 include lower half casings (first easing members) 10a, 20a, and 30a, and upper half casings (second casing members) 10b, 20b, and 30b. The lower half casings 10a, 20a, and 30a are portions in the circumferential direction Dc and form the lower side of each of the casings 10, 20, and 30. The upper half casings 10b, 20b, and 30b are the other portions in the circumferential direction Dc and form the upper side of each of the casings 10, 20, and 30.

The lower half casing 10a and the upper half casing 10b of the compressor casing 10 include half tube portions 11a and 11b, axial half flange portions 12a and 12b, and horizontal flange portions (circumferential flange portions) 13a and 13b, The half tube portions 11a and 11b form the halves of the lube portion 11 of the compressor casing 10. The axial half flange portions 12a and 12b form the halves in the circumferential direction Dc of the longitudinal flange portion 12. The horizontal flange portions 13a and 13b are formed on both ends in the circumferential direction Dc of the half tube portions 11a and 11b and are formed so as to protrude toward the outer side in the radial direction Dr from the half tube portions 11a and 11b.

Similar to the compressor casing 10, the lower half casing 20a and the upper half casing 20b of the turbine casing 20 also include half tube portions 21a and 21b, axial half flange portions 22a and 22b, and horizontal flange portions 23a and 23b. Similar to the compressor casing 10, the lower half casing 30a and the upper half casing 30b of the exhaust casing 30 also include half tube portions 31a and 31b, axial half flange portions 32a and 32b, and horizontal flange portions 33a and 33b.

The horizontal flange portions 13a, 23a, and 33a of the lower half casings 10a, 20a, and 30a and the horizontal flange portions 13b, 23b, and 33b of the upper half casings 10b, 20b, and 30b of each of the casings 10, 20, and 30 face each other and are connected to each other by a bolt and a nut which are a fastener. The bolt and the nut which connect the lower half casing 10a and the upper half casing 10b of the compressor casing 10, the bolt and the nut (second fastener) which connect the lower half casing 20a and the upper half casing 20b of the turbine casing 20, and the bolt and the nut (third fastener) which connect the lower half casing 30a and the upper half casing 30b of the exhaust casing 30 may have the same sizes as one another or may have different sizes from one another.

In addition, the gas turbine of the present embodiment includes an auxiliary member set for assembly/disassembly for easily performing the assembly and disassembly of the gas turbine casing 9.

As shown in FIGS. 2 to 5, the auxiliary member set for assembly/disassembly includes four auxiliary members for assembly/disassembly 40 which are the same as one another. The auxiliary member for assembly/disassembly 40 includes a fixing portion 41 and a jack receiving portion 45. The fixing portion 41 is fixed to one half casing 30a (or 30b) of the lower half casing 30a and the upper half casing 30b of the exhaust casing 30. The jack receiving portion 45 extends from the fixing portion 41 and faces the outer surface of the other half casing 30b (or 30a).

The fixing portion 41 is formed in a rectangular parallelepiped shape, and one surface of the rectangular parallelepiped forms a fixed surface 42 which contacts the outer surface of the horizontal flange portion 33a (or 33b) of one half casing 30a (or 30b). A plurality of bolt holes 41v which penetrate from a fixed opposite surface 42x paired with the fixed surface 42 to the fixed surface 42 are formed in the fixing portion 41. In addition, hereinafter, in the rectangular parallelepiped fixing portion 41, one surface adjacent to the fixed surface 42 is referred to as a first axial receiving surface 43, a surface paired with the first axial receiving surface 43 is referred to as a receiving opposite surface 43x, and a pair of surfaces which is adjacent to the fixed surface 42 and the first axial receiving surface 43 and faces toward the circumferential direction Do is referred to as circumferential surfaces 44.

The jack receiving portion 45 includes a radial receiving portion 46 and an axial receiving portion 48.

The radial receiving portion 46 extends in a direction perpendicular to one circumferential surface 44 of the fixing portion 41 and is funned along the fixed opposite surface 42x.

The axial receiving portion 48 extends in the direction perpendicular to the circumferential surface 44 and is formed along the receiving opposite surface 43x.

That is, the jack receiving portion 45 is formed in an L shape, one of the vertical line and horizontal line of the L shape forms the radial receiving portion 46, and the other forms the axial receiving portion 48. In the radial receiving portion 46, a surface of the fixed surface 42 side of the fixing portion 41 forms a radial receiving surface 47 parallel to the fixed surface 42. In the axial receiving portion 48, a surface of the first axial receiving surface 43 side of the fixing portion 41 forms a second axial receiving surface 49 parallel to the first axial receiving surface 43.

In the present embodiment, the above-described four auxiliary members for assembly/disassembly 40 are fixed to the exhaust casing 30 in advance. Specifically, two auxiliary members for assembly/disassembly 40 of four auxiliary members for assembly/disassembly 40 are set as first auxiliary members for assembly/disassembly 40a and are fixed to the pair of horizontal flange portions 33a in the lower half casing 30a of the exhaust casing 30. In one first auxiliary member for assembly/disassembly 40a of two first auxiliary members for assembly/disassembly 40a, the fixed surface 42 contacts the radial end surface of the horizontal flange portion 33a in the lower half casing 30a, and the radial receiving surface 47 faces the radial end surface of the horizontal flange portion 33b in the upper half casing 30b. In this state, the first auxiliary member for assembly/disassembly 40a is fixed to the horizontal flange portion 33a of the lower half casing 30a using bolts 50 (FIG. 5) which are inserted into the bolt holes 41v of the fixing portion 41. Similar to the above-described first auxiliary member for assembly/disassembly 40a, one remaining first auxiliary member for assembly/disassembly 40a is fixed to the horizontal flange portion 33a of the opposite side in the radial direction in the lower half casing 30a. Two remaining auxiliary members for assembly/disassembly 40 of four auxiliary members for assembly/disassembly 40 are set as second auxiliary members for assembly/disassembly 40b and are fixed to the pair of horizontal flange portions 33b in the upper half casing 30b of the exhaust casing 30. In one second auxiliary member for assembly/disassembly 40b of two second auxiliary members for assembly/disassembly 40b, the fixed surface 42 contacts the radial end surface of the horizontal flange portion 33b in the upper half casing 30b, the radial receiving surface 47 faces the radial end surface of the horizontal flange portion 33a in the lower half casing 30a, and the first axial receiving surface 43 faces the second axial receiving surface 49 of the first auxiliary member for assembly/disassembly 40a. In this state, the second auxiliary member for assembly/disassembly 40b is fixed to the horizontal flange portion 33b of the upper half casing 30b using bolts 50 which are inserted into the bolt holes 41v of the fixing portion 41. Similar to the above-described second auxiliary member for assembly/disassembly 40b, one remaining second auxiliary member for assembly/disassembly 40*b* is fixed to the horizontal flange portion 33*b* of the opposite side in the radial direction in the upper half casing 30*b*.

Next, disassembly and assembly procedures of the gas turbine casing 9 at the time of repair and inspection, or the like will be described.

The gas turbine casing 9 is deformed due to its own weight, secular deformation due to use for a long time, or the like, and as shown by a thick broken line L in FIG. 1, the center portion in the axial direction Da of the gas turbine casing 9 is lowered, and both end portions in the axial direction Da of the gas turbine casing 9 are lifted. In this way, if the gas turbine casing 9 is deformed, an interval in the axial direction Da between the upper end of the upper half casing 10*b* of the compressor casing 10 and the upper end of the upper half casing 30*b* of the exhaust casing 30 is narrowed with respect to an interval in the axial direction Da between the lower end of the upper half casing 10*b* of the compressor casing 10 and the lower end of the upper half casing 30*b* of the exhaust casing 30 which are disposed on the end side in the axial direction Da. Thereby, at the time of disassembly of the gas turbine casing 9, even if all bolts and nuts which connect the upper half casing 20*b* of the turbine casing 20 which is disposed in the center portion in the axial direction Da and other casings are removed, it is difficult to lift the upper half casing 30*b* of the turbine casing 20.

Figure 6:
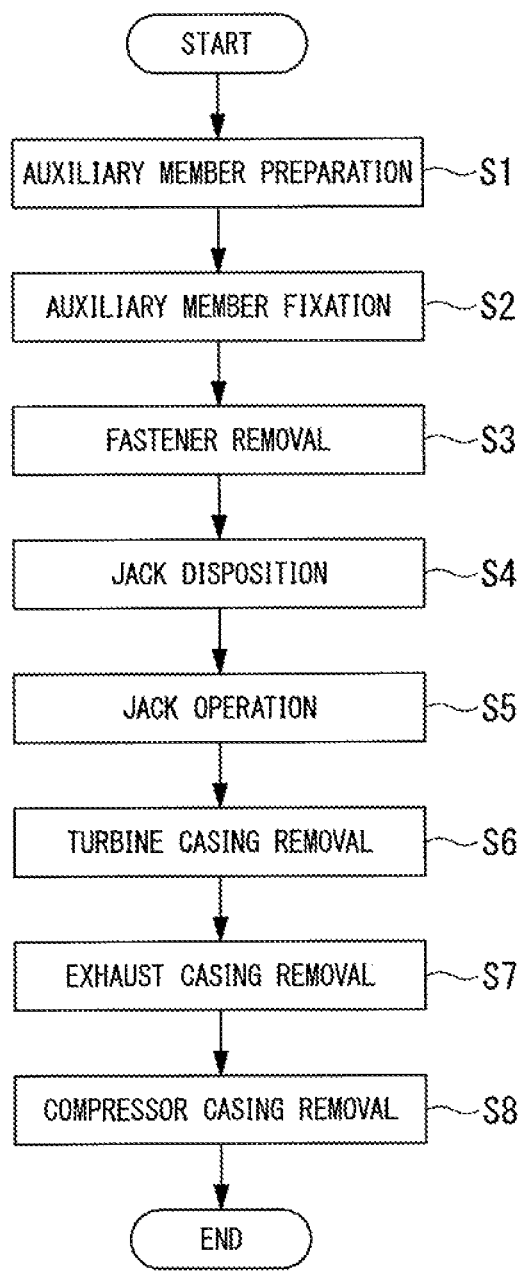
FIG. 6 is a flowchart showing a disassembly procedure of the gas turbine casing in the embodiment according to the present invention.

Therefore, hereinafter, disassembly procedure of the gas turbine casing 9 at the time of the repair and inspection, or the like will be described according to a flowchart shown in FIG. 6. Moreover, in a state where the lower half casings 10*a*, 20*a*, and 30*a* of the compressor casing 10, the turbine casing 20, and the exhaust casing 30 are mounted, the basic repair and inspection of the gas turbine can be performed by removing only the upper half casings 10*b*, 20*b*, and 30*b*. Therefore, hereinafter, the removing procedure (disassembly procedure) of the upper half casings 10*b*, 20*b*, and 30*b* will be described.

Figure 4:
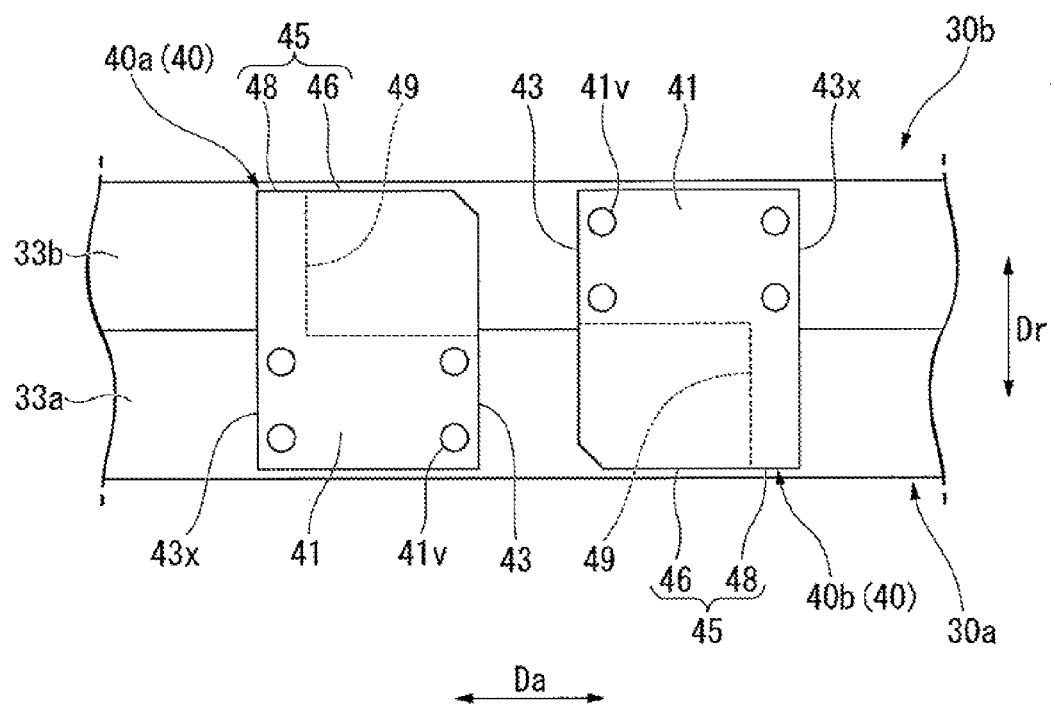
FIG. 4 is a side view of the auxiliary member for assembly/disassembly and the gas turbine casing around the auxiliary member in the embodiment according to the present invention.
Figure 5:
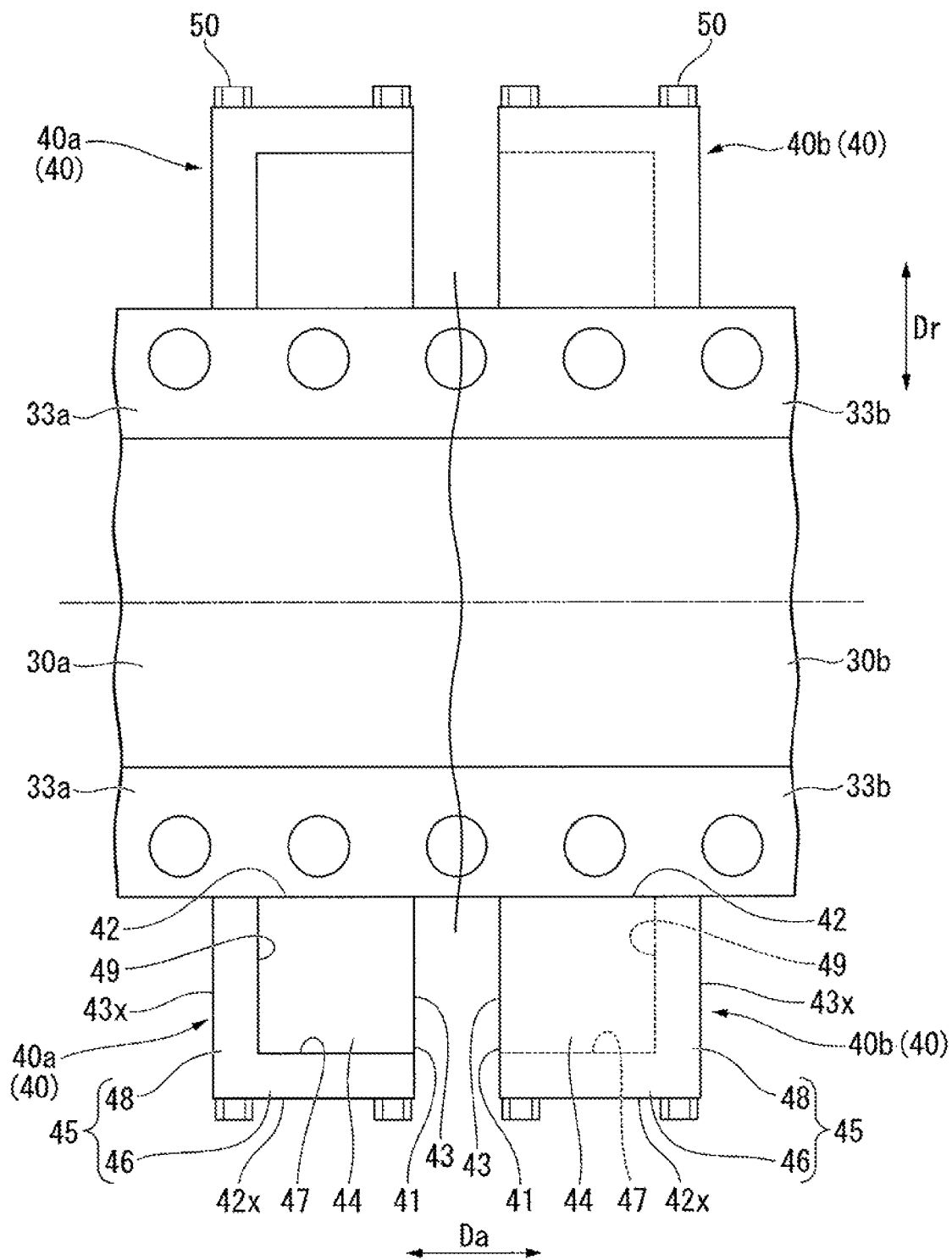
FIG. 5 is a plan view of the auxiliary member for assembly/disassembly and the gas turbine casing around the auxiliary member in the embodiment according to the present invention.

First, the above-described plurality of auxiliary members for assembly/disassembly 40 is prepared (S1). Next, the plurality of auxiliary members for assembly/disassembly 40 is fixed to the exhaust casing 30 (S2). At this time, as shown in FIGS. 4 and 5, the first auxiliary member for assembly/disassembly (first axial auxiliary member) 40*a* of the plurality of auxiliary members for assembly/disassembly 40 is fixed to the lower half casing (first casing member) 30*a* of the exhaust casing 30 using the bolts 50 (FIG. 5). In addition, the second auxiliary member for assembly/disassembly (second axial auxiliary member) 40*b* is fixed to the upper half casing (second casing member) 30*b* using bolts 50 with an interval in the axial direction Da to the first auxiliary member for assembly/disassembly 40*a*. If each of the auxiliary members for assembly/disassembly 40*a* and 40*b* is fixed, the first axial receiving surface 43 of the first auxiliary member for assembly/disassembly 40*a* and the second axial receiving surface 49 of the second auxiliary member for assembly/disassembly 40*b* are perpendicular to each other in the axial direction Da and face each other. The second axial receiving surface 49 of the first auxiliary member for assembly/disassembly 40*a* and the first axial receiving surface 43 of the second auxiliary member for assembly/disassembly 40*b* are perpendicular to each other in the axial direction Da and face each other. Moreover, in the case of the present embodiment, the plurality of auxiliary members for assembly/disassembly 40 are prepared in the manufacturing process of the gas turbine, and the plurality of auxiliary members for assembly/disassembly 40 are fixed to the exhaust casing 30. Therefore, the preparation step (S1) and the fixation step (S2) of the auxiliary member for assembly/disassembly 40 are included in the manufacturing process of the gas turbine.

Next, the bolts and the nuts which connect the lower half casing 10*a* and the upper half casing 10*b* of the compressor casing 10 are removed. The bolts and the nuts which connect the lower half casing 20*a* and the upper half casing 20*b* of the turbine casing 20 are removed. The bolts and the nuts which connect the lower half casing 30*a* and the upper half casing 30*b* of the exhaust casing 30 are removed. In addition, the bolts and the nuts which connect the upper half casing 10*b* of the compressor casing 10 and the upper half casing 20*b* of the turbine casing 20 are removed. The bolts and the nuts which connect the upper half easing 20*b* of the turbine casing 20 and the upper half casing 30*b* of the exhaust casing 30 are removed (S3). Moreover, the order in which the bolts and the nuts are removed is not limited to the above-described order.

Figure 7:
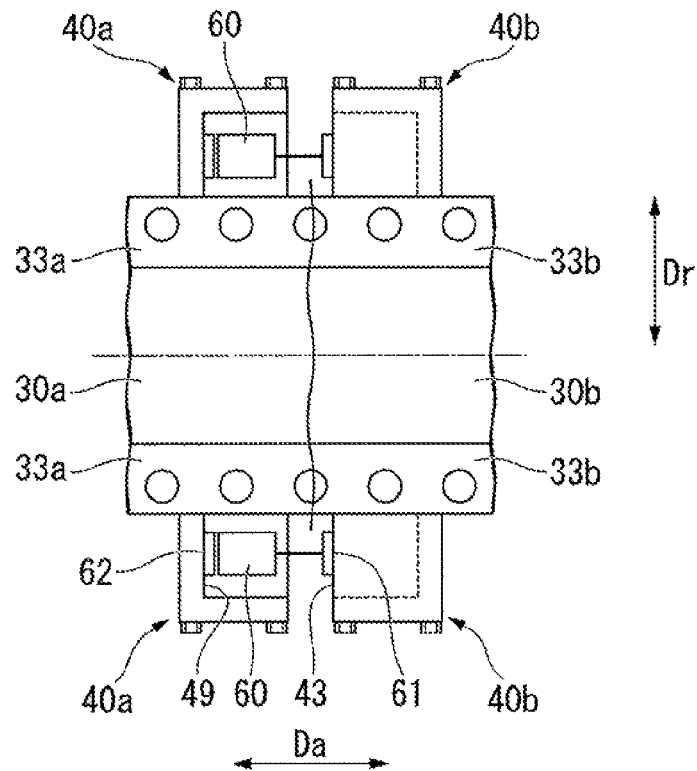
FIG. 7 is a plan view of the auxiliary member for assembly/disassembly and the gas turbine casing around the auxiliary member in a disassembly process of the embodiment according to the present invention.
Figure 8:
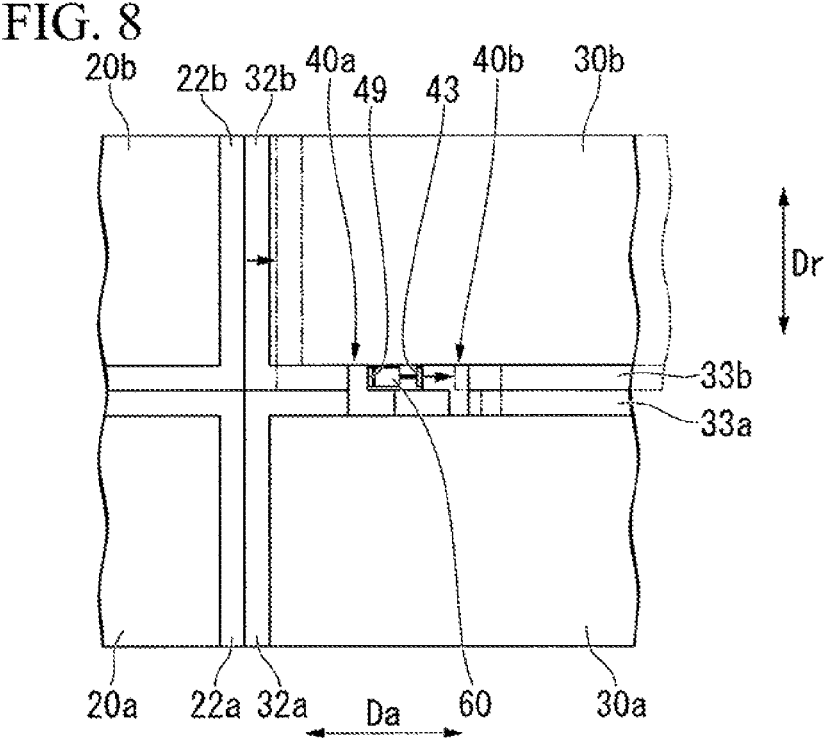
FIG. 8 is a side view of the auxiliary member for assembly/disassembly and the gas turbine casing around the auxiliary member in the disassembly process of the embodiment according to the present invention.

Next, as shown in FIGS. 7 and 8, a jack 60 is disposed between the second axial receiving surface 49 of the first auxiliary member for assembly/disassembly 40*a* which is fixed to the lower half casing 30*a* of the exhaust casing 30 and the first axial receiving surface 43 of the second auxiliary member for assembly/disassembly 40*b* which is fixed to the upper half casing 30*b* of the exhaust casing 30 (S4). At this time, a head surface 61 of the jack 60 contacts one receiving surface 43 (or 49) of the second axial receiving surface 49 of the first auxiliary member for assembly/disassembly 40*a* and the first axial receiving surface 43 of the second auxiliary member for assembly/disassembly 40*b*, and a base surface 62 of the jack 60 contacts the other receiving surface 49 (or 43). Moreover, the jack 60 used at this time may be a mechanical jack which uses a screw or the like, or may be a hydraulic jack, and in the present embodiment, the drive form of the jack does not matter.

In addition, here, the jack 60 is disposed between the second axial receiving surface 49 of the first auxiliary member for assembly/disassembly 40*a* and the first axial receiving surface 43 of the second auxiliary member for assembly/disassembly 40*b*. However, the jack 60 may be disposed between the first axial receiving surface 43 of the first auxiliary member for assembly/disassembly 40*a* and the second axial receiving surface 49 of the second auxiliary member for assembly/disassembly 40*b*. Here, the jacks 60 and 60 are disposed between the first auxiliary members for assembly/disassembly 40*a* and 40*a* which are fixed to each of the pair of horizontal flange portions 33*a* and 33*a* of the lower half casing 30*a* and the second auxiliary members for assembly/disassembly 40*b* and 40*b* which are fixed to each of the pair of horizontal flange portions 33*b* and 33*b* of the upper half casing 30*b*. However, the jack 60 may be disposed only between the first auxiliary member for assembly/disassembly 40*a* which is fixed to one of the pair of horizontal flange portions 33*a* of the lower half easing 30*a* and the second auxiliary member for assembly/disassembly 40*b* which is fixed to one of the pair of horizontal flange portions 33*b* of the upper half casing 30*b*.

In the present embodiment, the plurality of auxiliary members for assembly/disassembly 40 is fixed to the exhaust casing 30 in advance. However, when the plurality of auxiliary members for assembly/disassembly 40 are not fixed to the exhaust casing 30 in advance, it is necessary to perform the auxiliary member preparation step (S1) and the auxiliary member fixation step (S2) before the jack disposition step (S4) at the latest.

Next, the interval between the head surface 61 and the base surface 62 of the jack 60 which faces toward the axial direction Da of the gas turbine casing 9 is widened by operating the jack 60 (S5). As a result, the upper half casing 30b and the lower half casing 30a of the exhaust casing 30 move to directions which are opposite to each other in the axial direction Da. In this case, in the state where the lower half casing 30a of the exhaust casing 30 is fixed, the upper half casing 20b of the turbine casing 20 is positioned on the upstream side of the upper half casing 30b of the exhaust casing 30. Thereby, as shown in FIG. 8, the upper half casing 30b of the exhaust casing 30 moves in the direction away from the upper half casing 20b of the turbine casing 20 in the axial direction Da, that is, to the downstream side, and is separated from the upper half casing 20b of the turbine casing 20. In this way, since the plurality of auxiliary members for assembly/disassembly 40 which are prepared in Step 1 and are fixed in Step 2 are used for moving the upper half casing 30b of the exhaust casing 30 in the axial direction Da at the time of disassembly, the auxiliary members for assembly/disassembly function as the axial auxiliary member.

Next, the upper half casing 20b of the turbine casing 20 is lifted using a crane or the like, and the upper half casing 20b is removed from the lower half casing 20a (S6).

As described above with reference to FIG. 1, it is assumed that the gas turbine casing 9 is deformed due to own weight, and the interval between the upper end of the upper half casing 10b of the compressor casing 10 and the upper end of the upper half casing 30b of the exhaust casing 30 is narrowed with respect to the interval between the lower end of the upper half casing 10b of the compressor casing 10 and the lower end of the upper half casing 30b of the exhaust casing 30.

However, in the present embodiment, the upper half casing 30b of the exhaust casing 30 moves to the downstream side, and since the interval in the axial direction Da between the upper half casing 10b of the compressor casing 10 and the upper half casing 30b of the exhaust casing 30 is widened, the flange or the like of the upper half casing 20b of the turbine casing 20 is not damaged, and the upper half casing 20b can be easily removed.

Next, the upper half casing 30b of the exhaust casing 30 and the upper half casing 10b of the compressor casing 10 are sequentially lifted using a crane or the like, and the upper half casings 30b and 10b are removed (S7 and S8). In this way, the disassembly operation of the gas turbine casing 9 finishes. Moreover, here, the upper half casing 30b of the exhaust casing 30 is removed after the upper half casing 20b of the turbine casing 20 is removed. However, conversely, the upper half casing 20b of the turbine casing 20 may be removed after the upper half casing 30b of the exhaust casing 30 is removed.

Figure 11:
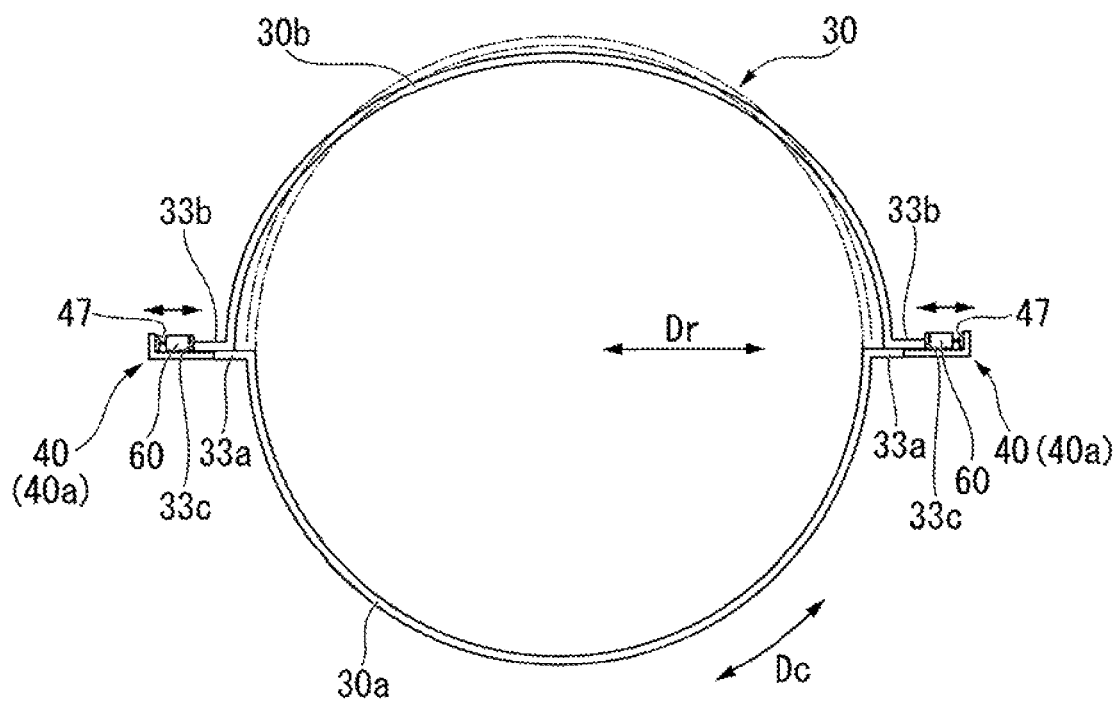
FIG. 11 is an explanatory view (first) showing the auxiliary member for assembly/disassembly and the exhaust casing when viewed from an axial direction in the assembly process of the embodiment according to the present invention.
Figure 12:
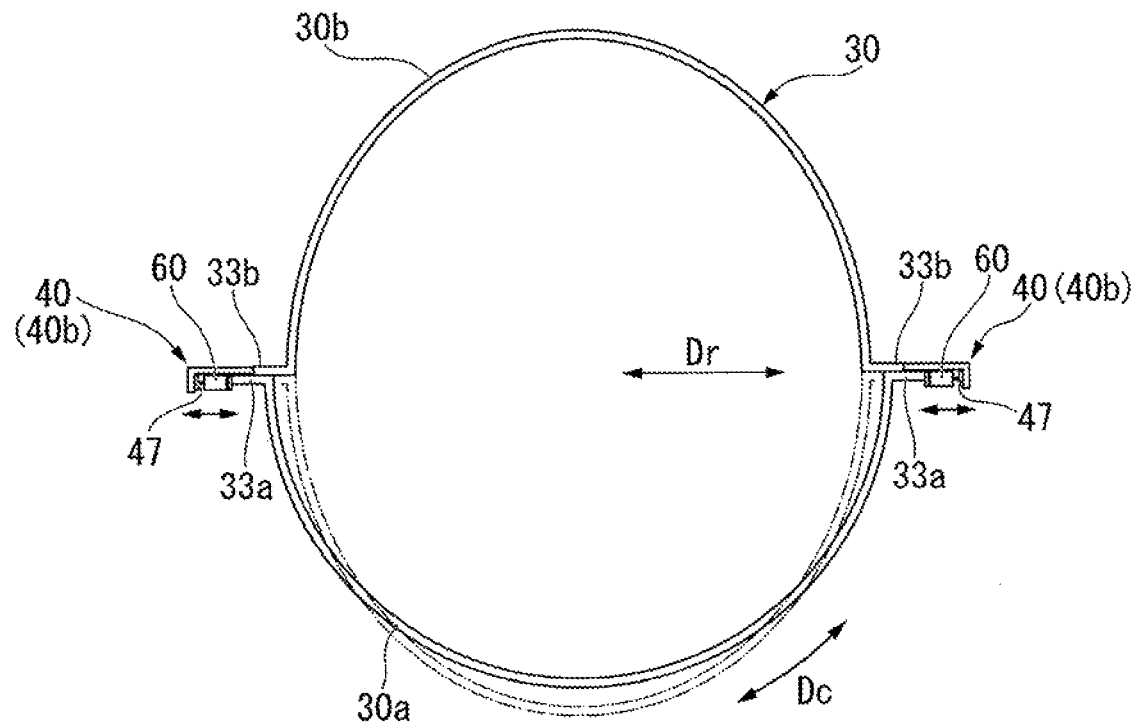
FIG. 12 is an explanatory view (second) showing the auxiliary member for assembly/disassembly and the exhaust easing when viewed from an axial direction in the assembly process of the embodiment according to the present invention.

Incidentally, in the lower half casings 10a, 20a, and 30a and the upper half casings 10b, 20b, and 30b of the compressor casing 10, the turbine casing 20, and the exhaust casing 30, in the stage where the bolts and the nuts which connect the lower half casings 10a, 20a, and 30a and the upper half casings 10b, 20b, and 30b are removed, as shown in FIGS. 11 and 12, an interval in the radial direction (horizontal direction) Dr between both end portions in the circumferential direction Dc of the upper half easing 30b may be widened or narrowed with respect to an interval in the radial direction (horizontal direction) Dr between both end portions in the circumferential direction Do of the lower half casing 30a due to effects of heat Particularly, the deformation tendency is high in the exhaust casing 30 which is subjected to a high temperature gas. Thereby, when the gas turbine casing 9 is assembled again after being disassembled, the positions in the radial direction Dr of both end portions in the circumferential direction Dc of the upper half casing 30b of the exhaust casing 30 and both end portions in the circumferential direction Do of the lower half casing 30a of the exhaust casing 30 do not match each other, and it is difficult to connect the upper half casing 30b and the lower half casing 30a.

Figure 9:
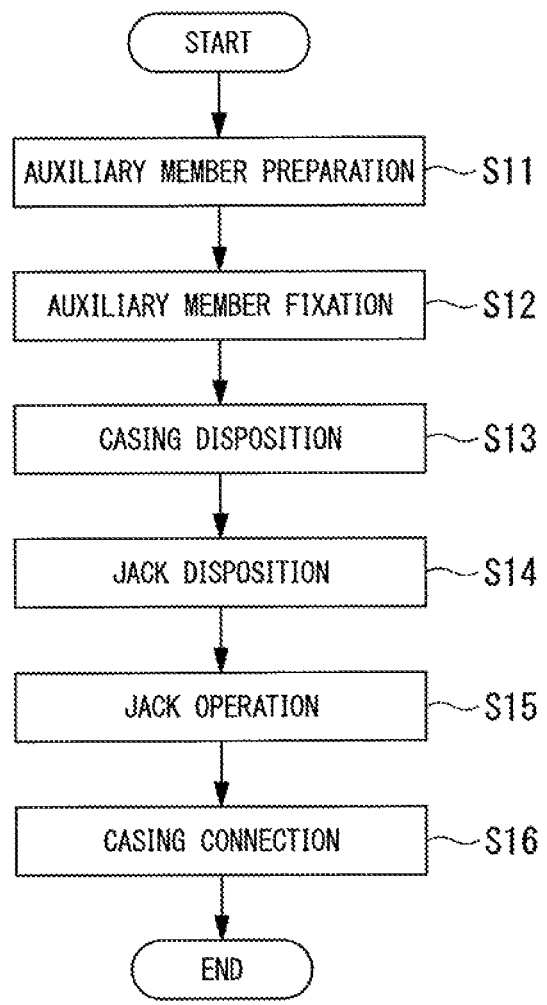
FIG. 9 is a flowchart showing an assembly procedure of the gas turbine casing in the embodiment according to the present invention.

Therefore, hereinafter, assembly procedure after the disassembly of the gas turbine casing 9 at the time of repair and inspection or the like will be described according to a flowchart shown in FIG. 9. In addition, here, only the assembly of the exhaust casing 30 which is subjected to a high temperature gas, that is, the procedure in which the upper half casing 30b of the exhaust casing 30 is connected to the lower half casing 30a will be described.

First, the above-described plurality of auxiliary members for assembly/disassembly 40 is prepared (S11). Next, the plurality of auxiliary members for assembly/disassembly 40 is fixed to the exhaust casing 30 (S12). At this time, the fixing portion 41 of the auxiliary member for assembly/disassembly 40 (40a) is fixed to one half casing 30a (or 30b), in which the interval in the radial direction (horizontal direction) Dr between both ends in the circumferential direction Dc is narrowed, of the lower half casing (first casing member) 30a and the upper half casing (second casing member) 30b of the exhaust casing 30. If the fixing portion 41 of each auxiliary member for assembly/disassembly 40 is fixed to the one half casing 30a (or 30b), the radial receiving surface 47 of each auxiliary member for assembly/disassembly 40 becomes the surface perpendicular to the radial direction Dr of the exhaust casing 30. Here, as shown in FIG. 11, in the interval in the radial direction (horizontal direction) Dr between both end portions in the circumferential direction Dc, the interval of the lower half casing 30a is narrower than that of the upper half casing 30b, and the auxiliary member for assembly/disassembly 40 is fixed to the lower half casing 30a. Moreover, in the case of the present embodiment, since the plurality of auxiliary members for assembly/disassembly 40 (40a and 40b) are prepared in the manufacturing process of the gas turbine and the plurality of auxiliary members for assembly/disassembly 40 are fixed to the exhaust casing 30 in advance, similar to the preparation step (S1) and the fixation step (S2) of the auxiliary member for assembly/disassembly 40 (40a and 40b) at the time of disassembly, the preparation step (S11) and the fixation step (S12) of the auxiliary member for assembly/disassembly 40 at the time of assembly are also included in the manufacturing process of the gas turbine.

Next, the upper half casing 30b is placed on the lower half casing 30a so that the inner surface of the lower half casing 30a and the inner surface of the upper half casing 30b of the exhaust casing 30 face each other (S13).

Figure 10:
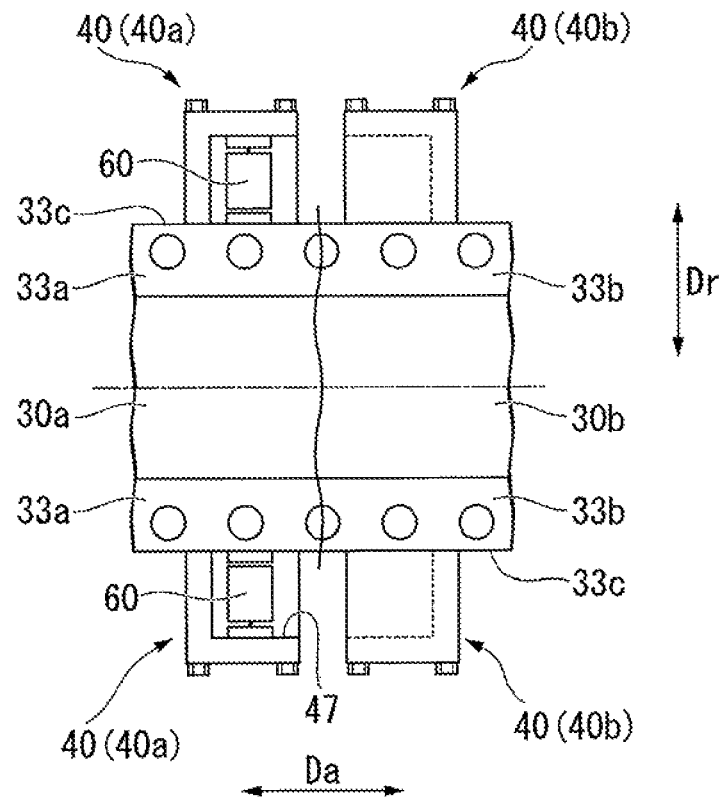
FIG. 10 is a plan view of the auxiliary member for assembly/disassembly and the exhaust casing around the auxiliary member in an assembly process of the embodiment according to the present invention.

Next, as shown in FIGS. 10 and 11, the jack 60 is disposed between the radial receiving surface 47 of the auxiliary member for assembly/disassembly 40 (40a and 40b) which is fixed to the lower half casing 30a and the end surface 33c in the radial direction Dr in the horizontal flange portion 33a of the upper half casing 30b (S14).

Moreover, in the present embodiment, the plurality of auxiliary members for assembly/disassembly 40 (40a and 40b) are fixed to the exhaust casing 30 in advance. However, when the plurality of auxiliary members for assembly/disassembly 40 (40a and 40b) are not fixed to the exhaust casing 30 in advance, it is necessary to perform the auxiliary member preparation step (S11) and the auxiliary member fixation step (S12) before the jack disposition step (S14) at the latest.

Next, the interval between the head surface and the base surface of the jack 60 which faces toward the radial direction Dr of the gas turbine casing 9 is widened by operating the jack 60 (S15). Due to this operation, in the upper half casing 30b of the exhaust casing 30, the interval in the radial direction Dr between both end portions in the circumferential direction Dc is narrowed. Moreover, in a stage where the positions of the bolt holes of the horizontal flange portions 33b which are formed on both end portions in the circumferential direction De of the upper half casing 30b coincide with the positions of the bolt holes of the horizontal flange portions 33a which are formed on both end portions in the circumferential direction Dc of the lower half casing 30a, the operation of the jack 60 is stopped. In this way, since the plurality of auxiliary members for assembly/disassembly 40 which are prepared in Step 11 and are fixed in Step 12 are used for correction of the deformation in the radial direction Dr of the lower half casing 30a or the upper half casing 30b at the time of assembly, the auxiliary members for assembly/disassembly function as the radial auxiliary members.

Moreover, bolts are inserted into the bolt holes of the horizontal flange portions 33b which are formed on both end portions in the circumferential direction Dc of the upper half casing 30b and the bolt holes of the horizontal flange portions 33a which are formed on both end portions in the circumferential direction Dc of the lower half casing 30a. Thereafter, the nuts are screwed to the screw portions of the bolts, and thus, the upper half easing 30b is connected to the lower half easing 30a (S16). In this way, the assembly operation of the exhaust casing 30 finishes.

As described above, the exhaust casing 30 is deformed due to heat, and thus, the interval in the radial direction (horizontal direction) Dr between both end portions in the circumferential direction Dc of the upper half casing 30b may be widened with respect to the interval in the radial direction (horizontal direction) Dr between both end portions in the circumferential direction Dc of the lower half casing 30a. Also in this ease, in the present embodiment, since the interval in the radial direction Dr between both end portions in the circumferential direction Dc of the upper half casing 30b is narrowed and is matched to the interval in the radial direction Dr between both end portions in the circumferential direction Dc of the lower half casing 30a, the upper half casing 30b can be easily connected to the lower half casing 30a.

In addition, in the above, the case where the interval in the radial direction Dr between both end portions in the circumferential direction Dc of the upper half casing 30b is widened with respect to the interval in the radial direction Dr between both end portions in the circumferential direction Dc of the lower half casing 30a is described. However, conversely, as shown in FIG. 12, the present invention can be also applied to a case where the interval in the radial direction Dr between both end portions in the circumferential direction Dc of the upper half casing 30b is narrowed with respect to the interval in the radial direction Dr between both end portions in the circumferential direction Dc of the lower half casing 30a. In this case, the auxiliary member for assembly/disassembly 40 (40b) is fixed to the upper half casing 30b in which the interval in the radial direction Dr between both end portions in the circumferential direction Dc is narrower than the lower half casing 30a (S12). In addition, the jack 60 is disposed between the radial receiving surface 47 of the auxiliary member for assembly/disassembly 40 which is fixed to the upper half casing 30b and the end surface in the radial direction Dr in the horizontal flange portion 33a of the lower half casing 30a (S14), and the jack 60 is operated (S15). As a result, the interval in the radial direction Dr between both end portions in the circumferential direction Dc of the lower half casing 30a is narrowed.

Figure 13:
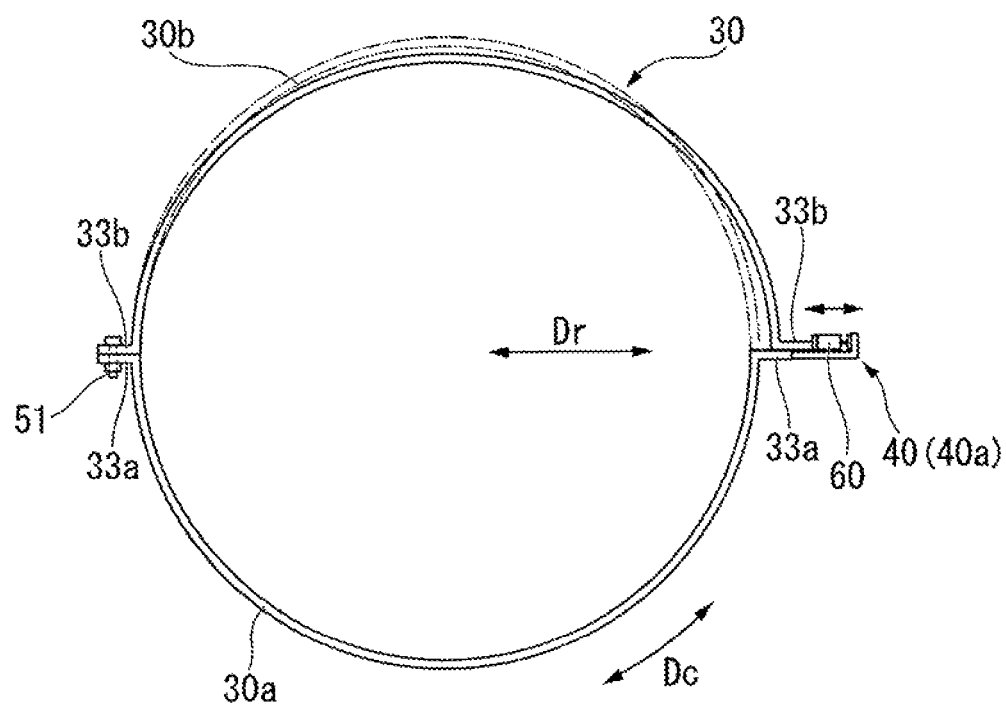
FIG. 13 is an explanatory view (third) showing the auxiliary member for assembly/disassembly and the exhaust casing when viewed from an axial direction in the assembly process of the embodiment according to the present invention.

In the above, the auxiliary members for assembly/disassembly 40 (40a and 40b) and 40 (40a and 40b) are fixed to each of the pair of horizontal flange portions 33a and 33a of the lower half casing 30a, and the jacks 60 and 60 are disposed between the upper half casing 30b and each of the auxiliary members for assembly/disassembly 40 (40a and 40b) and 40 (40a and 40b). However, as shown in FIG. 13, the auxiliary members for assembly/disassembly 40 (40a and 40b) may be fixed to only one of the pair of horizontal flange portions 33a of the lower half casing 30a, and the jack 60 may be disposed between the upper half casing 30b and the one auxiliary member for assembly/disassembly 40 (40a and 40b). In this case, after temporary connection or connection of the other horizontal flange portion 33a of the upper half casing 30b and the other horizontal flange portion 33b of the lower half casing 30a is preformed using the bolts and the nuts 51, one jack 60 is operated.

In the above, the case where the exhaust casing 30 is deformed due to heat is described as an example. However, the present invention can be also similarly applied to a case where the turbine casing 20 or the compressor casing 10 is deformed due to heat. In the above, the example of the gas turbine in which the rotor extends in the horizontal direction is described. However, when the easing is deformed also in the gas turbine in which the rotor extends in the vertical direction, the similar operation is performed on the first casing member which forms a portion in the circumferential direction Dc of the casing and the second casing member which forms the other portion in the circumferential direction Dc, and the present invention can cope with the deformation of the casing.

Figure 14:
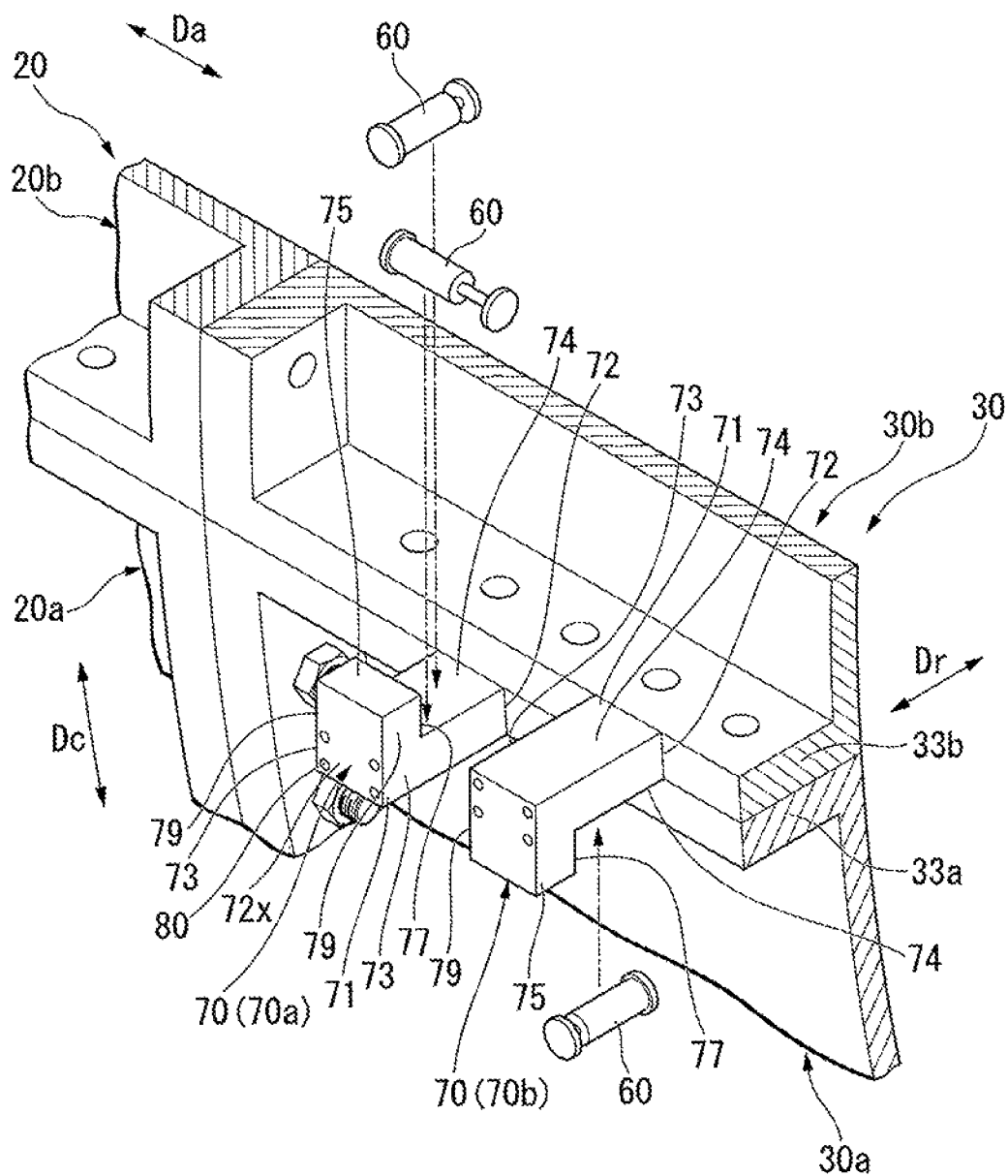
FIG. 14 is a perspective view of an auxiliary member for assembly/disassembly and a gas turbine casing around the auxiliary member in a modification example of the embodiment according to the present invention.

Next, a modification example of the auxiliary member for assembly/disassembly 40 in the above-described embodiment will be described with reference to FIG. 14.

Similar to the auxiliary member for assembly/disassembly 40 of the above-described embodiment, an auxiliary member for assembly/disassembly 70 of the present modification example includes a fixing portion 71, and a jack receiving portion 75 which extends from the fixing portion 71 and faces the outer surface of the other half casing 30b (or 30a). The fixing portion 71 is fixed to one half casing 30a (or 30b) of the upper half casing 30b and the lower half casing 30a. The jack receiving portion 75 extends from the fixing portion 71 and faces the outer surface of the other half casing 30b (or 30a).

Similar to the fixing portion 41 of the auxiliary member for assembly/disassembly 40 of the above-described embodiment, the fixing portion 71 is formed in a rectangular parallelepiped shape, and one surface of the rectangular parallelepiped forms a fixed surface 72 which contacts the outer surface of the horizontal flange portion 33a (or 33b) of one half casing 30a (or 30b). In addition, hereinafter, in the rectangular parallelepiped fixing portion 71, a surface paired with the fixed surface 72 is referred to as a fixed opposite surface 72x, a pair of surfaces adjacent to the fixed surface 72 is referred to as first axial receiving surfaces 73, and a pair of surfaces which is adjacent to the fixed surface 72 and the first axial receiving surface 73 and faces the circumferential direction Dc is referred to as circumferential surfaces 74. Bolt holes 80 are formed on the fixing portion 71. Thereby, when the fixing portion 71 is fixed to the horizontal flange portion 33a (or 33b), the fixing portion is fixed by bolts. However, the fixing portion 71 may be fixed using welding.

Unlike the jack receiving portion 45 of the auxiliary member for assembly/disassembly 40 of the above-described embodiment, the jack receiving portion 75 is formed in a rectangular parallelepiped shape and is formed along the fixed opposite surface 72x on one circumferential surface 74 of the fixing portion 71. In the jack receiving portion 75 of the rectangular parallelepiped shape, the surface parallel to the fixed surface 72 in the surface of the fixed surface 72 side of the fixing portion 71 forms a radial receiving surface 77. In the jack receiving portion 75, the surface parallel to the first axial receiving surface 73 of the fixing portion 71 forms a second axial receiving surface 79.

Similar to the case which uses the auxiliary member for assembly/disassembly 40 of the above-described embodiment, also in a case where the auxiliary member for assembly/disassembly 70 of the present modification example functions as the radial auxiliary member, the jack 60 is disposed between the radial receiving surface 77 of the auxiliary member for assembly/disassembly 70 and the horizontal flange portion 33b (or 33a) of the half casing 30b (30a) to which the auxiliary member for assembly/disassembly 70 is not fixed. Similar to the case which uses the auxiliary member for assembly/disassembly 40 of the above-described embodiment, also in a case where the auxiliary member for assembly/disassembly 70 of the present modification example functions as the axial auxiliary member, the jack 60 is disposed between the first axial receiving surface 73 of one auxiliary member for assembly/disassembly 70a and the second axial receiving surface 79 of the other auxiliary member for assembly/disassembly 70b of two auxiliary members for assembly/disassembly 70a and 70b which are disposed with an interval between each other in the axial direction Da.

As described above, like the present modification example, in the auxiliary member for assembly/disassembly 70, since bolt holes are not present in the fixing portion 71 and the jack receiving portion 75 is a rectangular parallelepiped shape, although the auxiliary member has a significantly simple shape, if the auxiliary member includes the fixing portion 71 which is fixed to one half casing 30a (or 30b) of the upper half casing 30b and the lower half casing 30a and the jack receiving portion 75 which extends from the fixing portion 71 and faces the outer surface of the other half casing 30b (or 30a), the function can be achieved. When the auxiliary members for assembly/disassembly 40 and 70 are fixed as the radial auxiliary member, it is preferable that the radial receiving surfaces 47 and 77 of the auxiliary members for assembly/disassembly 40 and 70 be perpendicular to the radial direction Dr of the casing. The reason is that stability of the jack 60 is increased. However, the radial receiving surfaces do not need to be perpendicular to the radial direction Dr of the casing. In addition, when the auxiliary members for assembly/disassembly 40 and 70 are fixed as the axial auxiliary member, it is preferable that the axial receiving surfaces 43, 49, 73, and 79 of the auxiliary members for assembly/disassembly 40 and 70 be perpendicular to the axial direction Da of the casing. The reason is that stability of the jack 60 is increased. However, the axial receiving surfaces do not need to be perpendicular to the axial direction Da of the casing.

REFERENCE SIGNS LIST

1: compressor, 2: turbine, 4: combustor. 5: compressor rotor, 6: turbine rotor, 9: gas turbine casing, 10: compressor casing, 10a, 20a, 30a: lower half casing (first casing member), 10b, 20b, 30b: upper half casing (second casing member), 12a, 12b, 22a, 22b, 32a. 32b: axial half flange portion, 13a, 13b, 23a, 23b, 33a, 33b: horizontal flange portion, 40, 70: auxiliary member for assembly/disassembly, 40a: first auxiliary member for assembly/disassembly, 40b: second auxiliary member for assembly/disassembly, 41, 71: fixing portion, 42, 72: fixed surface, 43, 73: first axial receiving surface, 45, 75: jack receiving portion, 47, 77: radial receiving surface, 49, 79: second axial receiving surface, 60: jack

The invention claimed is:

1. An auxiliary member for assembly/disassembly of a gas turbine casing which covers an outer circumference of a rotor which rotates about a rotational axis and in which a first casing member forming a portion in a circumferential direction of the gas turbine casing and a second casing member forming the other portion in the circumferential direction of the gas turbine casing are connected by a fastener, the auxiliary member comprising:
  a fixing portion which is fixed to a radial outer surface of a flange of one of the first and second casing members; and
  a jack receiving portion which extends from the fixing portion and faces a radial outer surface of a flange of the other of the first and second casing members.

2. The auxiliary member for assembly/disassembly of a gas turbine casing according to claim 1, wherein
  the first casing member and the second casing member respectively include flange portions which face each other and which are connected by the fastener,
  the fixing portion is fixed to the flange portion of one of the first and second casing members, and
  the jack receiving portion faces the flange portion of the other of the first and second casing members.

3. The auxiliary member for assembly/disassembly of a gas turbine casing according to claim 1, wherein
  a radial receiving surface, which faces the outer surface of the other of the first and second casing members with an interval therebetween and which is perpendicular to the radial direction with respect to the rotational axis, is formed on the jack receiving portion.

4. The auxiliary member for assembly/disassembly of a gas turbine casing according to claim 1, wherein
  axial receiving surfaces, which face toward one side in an axial direction in which the rotational axis extends and is perpendicular to the axial direction, is respectively formed on the jack receiving portion and the fixing portion.

5. An auxiliary member set for assembly/disassembly of a gas turbine casing, comprising:
  a plurality of the auxiliary members for assembly/disassembly of a gas turbine casing according to claim 1, wherein
  at least one portion of a plurality of the auxiliary members for assembly/disassembly forms first radial auxiliary members which include the fixing portion fixed to the first casing member, and
  the other portion of the plurality of the auxiliary members for assembly/disassembly forms second radial auxiliary members which include the fixing portion fixed to the second casing member.

6. The auxiliary member set for assembly/disassembly of a gas turbine casing according to claim 5, further comprising:
  a pair of the first radial auxiliary members and a pair of the second radial auxiliary members, wherein one of the first radial auxiliary members includes the fixing portion which is fixed to one end in the circumferential direction of the first casing member, the other of the first radial auxiliary members includes the fixing portion which is fixed to the other end in the circumferential direction of the first casing member, one of the second radial auxiliary members includes the fixing portion which is fixed to one end in the circumferential direction of the second casing member, and the other of the second radial auxiliary members includes the fixing portion which is fixed to the other end in the circumferential direction of the second casing member.

7. A gas turbine comprising:

the auxiliary member set for assembly/disassembly of a gas turbine casing according to claim 5; and the gas turbine casing which includes the first casing member and the second casing member.

8. An auxiliary member set for assembly/disassembly of a gas turbine casing, comprising:

at least a pair of the auxiliary members for assembly/disassembly of a gas turbine casing according to claim 1, wherein the pair of the auxiliary members for assembly/disassembly form radial auxiliary members, one of the radial auxiliary members includes the fixing portion which is fixed to one end portion in the circumferential direction of one of the first and second casing members, and the other of the radial auxiliary members includes the fixing portion which is fixed to the other end portion in the circumferential direction of one of the first and second casing members.

9. An auxiliary member set for assembly/disassembly of a gas turbine casing, comprising:

a plurality of the auxiliary members for assembly/disassembly of a gas turbine casing according to claim 1, wherein the plurality of the auxiliary members for assembly/disassembly form axial auxiliary members, one portion of the axial auxiliary members, as first axial auxiliary members, includes the fixing portion which is fixed to the first casing member, the other portion of the axial auxiliary members, as second axial auxiliary members, forms a group with any of the first axial auxiliary members, and includes the fixing portion which is fixed to the second casing member with an interval in an axial direction, in which the rotational axis extends, to the first axial auxiliary member which forms the group, and axial receiving surfaces which face each other with an interval therebetween in the axial direction are formed on the jack receiving portion of the first axial auxiliary member, and the fixing portion of the second axial auxiliary member which form the group with the first axial auxiliary member.

10. The auxiliary member set for assembly/disassembly of a gas turbine casing according to claim 9, further comprising:

a pair of the first axial auxiliary members, and a pair of the second axial auxiliary members which forms a group with the pair of the first axial auxiliary members, wherein one of the first axial auxiliary members includes the fixing portion which is fixed to one end in the circumferential direction of the first casing member, the other of the first axial auxiliary members includes the fixing portion which is fixed to the other end in the circumferential direction of the first casing member, one of the second axial auxiliary members includes the fixing portion which is fixed to one end in the circumferential direction of the second casing member with an interval in the axial direction to one of the first axial auxiliary members, and the other of the second axial auxiliary members includes the fixing portion which is fixed to the other end in the circumferential direction of the second casing member with an interval in the axial direction to the other of the first axial auxiliary member.

11. A gas turbine comprising:

the auxiliary member for assembly/disassembly of a gas turbine casing according to claim 1; and the gas turbine casing which includes the first casing member and the second casing member.

12. An assembly method of a gas turbine casing which covers an outer circumference of a rotor which rotates about a rotational axis and in which a first casing member forming a portion in a circumferential direction and a second casing member forming the other portion in the circumferential direction are connected by a fastener, the method comprising:

an auxiliary member preparation step of preparing an auxiliary member for assembly/disassembly in which a fixing portion which is fixed to one of the first and second casing members and a jack receiving portion which extends from the fixing portion and faces a radial outer surface of the other of the first and second casing members are formed;

an auxiliary member fixation step of fixing the fixing portion of the auxiliary member for assembly/disassembly to a radial outer surface of one of the first and second casing members;

a casing member disposition step of disposing the second casing member so as to face the first casing member;

a jack disposition step of disposing a jack between the jack receiving portion of the auxiliary member for assembly/disassembly which is fixed to one of the first and second casing members;

a jack operating step of widening the interval between both end portions of the jack, narrowing the interval in the radial direction between both end portions in the circumferential direction of the other of the first and second casing members, and making both end portions in the circumferential direction of the other of the first and second casing members face both end portions in the circumferential direction of one of the first and second casing members; and a casing connection step of connecting one of the first and second casing members and the other of the first and second casing members, in which both end portions face each other, by the fastener.

13. A disassembly method of a gas turbine casing which covers an outer circumference of a rotor which rotates about a rotational axis and in which a center side casing forming a portion in an axial direction in which the rotational axis extends and an end side casing forming an end side in the axial direction with respect to the center side casing are connected by a first fastener, in which the center side casing is configured so that a center side first casing member forming a portion in the circumferential direction and a center side second casing member forming the other portion in the circumferential direction are connected by a second fastener, and the end side casing is configured so that an end side first casing member which forms a portion in the circumferential direction, is adjacent in the axial direction to the center side first casing member, and is connected by the first fastener, and an end side second casing member which forms the other portion in the circumferential direction, is adjacent in the axial direction to the center side second casing member, and is connected by the first fastener are connected by a third fastener, the method comprising:

an auxiliary member preparation step of preparing a plurality of auxiliary members for assembly/disassembly in which a fixing portion which is fixed to one of the end side first casing member and the end side second casing member and a jack receiving portion which extends from the fixing portion and faces a radial outer surface of the other of the end side first casing member and the end side second casing member are formed;

an auxiliary member fixation step of fixing the fixing portion of a first auxiliary member for assembly/disassembly to a radial outer surface of the end side first casing member, and fixing the fixing portion of a second auxiliary member for assembly/disassembly to a radial outer surface of the end side second casing member so that the fixing portion faces the jack receiving portion of the first auxiliary member for assembly/disassembly with an interval in the axial direction therebetween;

a fastener removing step of removing the second fastener which connects the center side first casing member and the center side second casing member, removing the third fastener which connects the end side first casing member and the end side second casing member, and removing the first fastener which connects the center side second casing member and the end side second casing member;

a jack disposition step of disposing the jack between the jack receiving portion of the first auxiliary member for assembly/disassembly and the fixing portion of the second auxiliary member for assembly/disassembly, or between the fixing portion of the first auxiliary member for assembly/disassembly and the jack receiving portion of the second auxiliary member for assembly/disassembly;

a jack operating step of widening the interval between both end portions of the jack, and separating the end side second casing member in the axial direction from the center side second casing member; and a center side casing removing step of separating the center side second casing member from the center side first casing member in the state where the end side second casing member is separated in the axial direction.

* * * * *